(12) United States Patent
Heshmat Dehkordi et al.

(10) Patent No.: US 10,003,725 B2
(45) Date of Patent: Jun. 19, 2018

(54) METHODS AND APPARATUS FOR OPTICAL FIBER IMAGING

(71) Applicant: Massachusetts Institute of Technology, Cambridge, MA (US)

(72) Inventors: Barmak Heshmat Dehkordi, San Mateo, CA (US); Ik Hyun Lee, Chestnut Hill, MA (US); Hisham Bedri, Newton, MA (US); Ramesh Raskar, Palo Alto, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days. days.

(21) Appl. No.: 15/861,645

(22) Filed: Jan. 3, 2018

(65) Prior Publication Data

US 2018/0131851 A1    May 10, 2018

Related U.S. Application Data

(63) Continuation of application No. 15/151,417, filed on May 10, 2016, now Pat. No. 9,894,254.

(51) Int. Cl.
*H04N 5/225*    (2006.01)
*G02B 6/06*    (2006.01)

(52) U.S. Cl.
CPC ............ *H04N 5/2254* (2013.01); *G02B 6/06* (2013.01); *H04N 5/2253* (2013.01); *H04N 5/2256* (2013.01)

(58) Field of Classification Search
CPC ...... G02B 6/06; H04N 5/2253; H04N 5/2254; H04N 5/2256
See application file for complete search history.

(56) References Cited

U.S. PATENT DOCUMENTS

| 6,587,189 B1 * | 7/2003 | Roberts | G02B 6/04 348/E5.028 |
| 7,946,341 B2 * | 5/2011 | Hartog | E21B 43/26 166/254.1 |
| 9,578,221 B1 * | 2/2017 | Brown | H04N 5/2256 |

(Continued)

OTHER PUBLICATIONS

Bremer, K., et al., Fibre optic pressure and temperature sensor for geothermal wells; published in IEEE Sensors Conference, pp. 538-541, Nov. 2010.

(Continued)

*Primary Examiner* — Amy Hsu
(74) *Attorney, Agent, or Firm* — Stephen R. Otis

(57) ABSTRACT

An open-ended, incoherent bundle of optical fibers transmits light from a nearby scene. A camera captures images of the back end of the fiber bundle. Because the fiber bundle is incoherent, the captured image is shuffled, in the sense that the relative position of pixels in the image differs from the relative position of the scene regions that correspond to the pixels. Calibration is performed in order to map from the front end positions to the back-end positions of the fibers. In the calibration, pulses of light are delivered, in such a way that the time at which light reflecting from a given pulse enters a given fiber directly correlates to the position of the front end of the given fiber. A time-of-flight sensor takes measurements indicative of these time signatures. Based on the map obtained from calibration, a computer de-shuffles the image.

20 Claims, 15 Drawing Sheets

(56) References Cited

U.S. PATENT DOCUMENTS

| | | | | |
|---|---|---|---|---|
| 9,709,733 | B2* | 7/2017 | Godavarty | G02B 6/06 |
| 2013/0279920 | A1* | 10/2013 | Herzog | G02B 6/36 |
| | | | | 398/212 |
| 2014/0320609 | A1* | 10/2014 | Stettner | G01S 17/023 |
| | | | | 348/47 |
| 2015/0015879 | A1* | 1/2015 | Papadopoulos | G02B 23/26 |
| | | | | 356/301 |
| 2016/0018593 | A1* | 1/2016 | Tasker | G02B 6/3885 |
| | | | | 385/37 |
| 2016/0296121 | A1* | 10/2016 | Herzog | A61B 8/0825 |
| 2017/0078591 | A1* | 3/2017 | Petrov | H04N 5/332 |
| 2017/0146657 | A1* | 5/2017 | Xu | G01S 17/36 |

OTHER PUBLICATIONS

Chibani, H., et al., Near-field scanning optical microscopy using polymethylmethacrylate optical fiber probes; published in Ultramicroscopy, Feb. 2010;110(3):211-5. doi: 10.1016.

Cizmar, T. et al., Exploiting multimode waveguides for pure fibre-based imaging; published in Nature Communications 3, Article No. 1027 doi:10.1038/ncomms2024, Aug. 28, 2012.

Demuynck, O., et al., Incoherent optical fiber bundle calibration for image transmission: faster, finer, and higher-resolution image reconstruction; published in Optical Engineering, vol. 50, Issue 3, Mar. 2011.

Dunsby, C., et all, Techniques for depth-resolved imaging through turbid media including coherence-gated imaging; published in Journal of Physics D: Applied Physics, vol. 36, No. 14, pp. R207-R227, 2003.

Epstein, J., et al., Fluorescence-based fibre optic arrays: a universal platform for sensing; published in Chem. Soc. Rev., 2003,32, pp. 203-214.

Fernandez, P., et al., Differential Binary Encoding Method for Calibrating Image Sensors Based on IOFBs; published in Sensors, vol. 12, Issue 4, pp. 4133-4155; doi:10.3390/s120404133.

Fernandez, P., et al., Improving the Calibration of Image Sensors Based on IOFBs, Using Differential Gray-Code Space Encoding; published in Sensors 2012, vol. 12, Issue 7, pp. 9006-9023; doi:10.3390/s120709006.

Fernandez, P., et al., Calibration of Incoherent Optical Fiber Bundles for Image Transmission. Fibers Detection Process; published in IEEE International Symposium on Intelligent Signal Processing, 2007; WISP 2007; pp. 1-6.

Heshmat, B., The future of imaging; transcript and excerpted images from TEDxBeaconStreet presentation, Dec. 3, 2014, video of presentation accessed at https://www.youtube.com/watch?v=3h7gq-xuXLA.

Kim, P., et al., In vivo wide-area cellular imaging by side-view endomicroscopy; Nature Methods 7, 303-305 (2010).

Lee, I., et al., Accurate Registration Using Adaptive Block Processing for Multispectral Images; published in IEEE Transactions on Circuits and Systems for Video Technology, vol. 23, Issue 9, pp. 1491-1501, Sep. 2013.

Michel, K., et al., Monitoring of pollutant in waste water by infrared spectroscopy using chalcogenide glass optical fibers; published in Sensors and Actuators B: Chemical, vol. 101, Issues 1-2, Jun. 15, 2004, pp. 252-259.

Nakagawa, K., et al., Sequentially timed all-optical mapping photography (STAMP); published in Nature Photonics 8, 695-700 (2014).

Patwardhan, S., et al., Quantitative diffuse optical tomography for small animals using an ultrafast gated image intensifier; published in Journal of Biomedical Optics, Jan.-Feb. 2008;13(1):011009. doi: 10.1117/1.2830656.

Satat, G., et al., Locating and classifying fluorescent tags behind turbid layers using time-resolved inversion; published in Nature Communications 6, Article 6796 doi:10.1038, Apr. 13, 2015.

Velten, A., et al., Femto-photography: capturing and visualizing the propagation of light; published in ACM Transactions on Graphics (TOG)—SIGGRAPH 2013, vol. 32 Issue 4, Jul. 2013, Article No. 44, ACM New York, NY, USA.

Velten, A., et al., Recovering three-dimensional shape around a corner using ultrafast time-of-flight imaging; published in Nature Communications 3, Article 745, doi:10.1038/ncomms1747, Mar. 20, 2012.

Zhou, B., et al., Wireless Sensor Network Platform for Intrinsic Optical Fiber pH Sensors; published in IEEE Sensors Journal, vol. 14, Issue 4, pp. 1313-1320, Dec. 12, 2013.

Zitova, B., et al., Image registration methods: a survey; published in Image and Vision Computing, vol. 21, Issue 11, Oct. 2003, pp. 977-1000.

* cited by examiner

METHODS AND APPARATUS FOR OPTICAL FIBER IMAGING

RELATED APPLICATIONS

This application is a continuation of U.S. application Ser. No. 15/151,417 filed on May 10, 2016.

FIELD OF TECHNOLOGY

The present invention relates generally to optical fiber imaging.

SUMMARY

In illustrative implementations of this invention, an open-ended, incoherent bundle of optical fibers transmits light from a nearby scene.

The open end of the fiber bundle is not constrained by an outer sheath. The fibers are flexible. Thus, at the open end of the bundle, the fibers spread out and are free to bend and move relative to each other. A sheathed portion of the fiber bundle is located behind the open end of the bundle, behind the open end. The sheathed portion is more compact in cross-section than is the open end. The sheathed portion may extend a short or long distance. A camera captures images of the back end of the fiber bundle.

Imaging with an open-ended incoherent bundle of optical fibers has many practical advantages. Compared to a conventional coherent fiber bundle, an open-ended, incoherent fiber bundle typically is much more flexible. Thus, for example, the flexible open end of the bundle may be inserted: (a) into irregularly shaped cavities, the shape of which is unknown in advance; or (b) through porous barriers, to image a scene on the other side of the barrier. Also, compared to a conventional coherent fiber bundle, an open-ended, incoherent fiber bundle typically has a much wider field of view, because the fibers spread out at the open end of the bundle.

In illustrative implementations, the lensless front tips of the fibers are well-suited for imaging a nearby scene. In some use scenarios, the flexible fibers spread out and image a wide area of a surface from up close. For example, the surface being imaged may be inside a living organism, or inside an oil well or refinery pipe.

In illustrative implementations, the open-end of the fiber bundle is well-suited for capturing images in a turbid media. For example, the fibers in the open end may spread out in a turbid media and image, from up close, particles or objects that are floating or suspended in a large volume of the media.

In illustrative implementations of this invention, the fiber bundle is immune to EM (electromagnetic) noise, robust to extreme temperatures (e.g., 1500° C. for ruby fibers), and waterproof.

Allowing the fibers at the open end to bend freely and spread out has many advantages, as discussed above. However, it presents a challenge: unless calibration is performed, one does not where the fiber tips are located in the scene. Because the fibers are free to bend at the open end, their position in the open end is random and is not known in advance.

The position of the fibers at the front end is, loosely speaking, "shuffled." One fiber bends this way; another fiber bends that way, and so on. This means that the position of the fibers relative to each other at the back end of the fiber bundle (where the bundles are closely packed and constrained from moving relative to each other, due to an outer sheath) is not the same as the position of the fibers relative to each other at the front, open end of the bundle (where the fibers are near the scene and free to bend and move relative to each other).

A digital camera images the back end of the fiber bundle. The captured image, too, is "shuffled", in the sense that the relative position of pixels in the image is not the same as the relative position of the scene regions that correspond to these pixels.

In illustrative implementations of this invention, calibration is performed in order to calculate a map that maps from (a) the relative position of the front ends of the fibers to (b) the relative positions of the back ends of the fibers. Based on the calculated map, a computer then "de-shuffles" the image of the back end of the fiber bundle that was captured by the camera. That is, the computer rearranges the pixels of the original image to make a correct, de-shuffled digital image. In the de-shuffled image, the relative position of the pixels in the image is the same as the relative position of the scene regions to which the pixels correspond.

In illustrative implementations, the calibration may be made repeatedly during normal operation of the imaging system, to adjust for changes in position of the flexible fibers at the open end (scene end) of the bundle over time. For example, the changes in position of the fibers at the open end may be due to moving the open end of the bundle through different regions of an irregular cavity being imaged. Or, for example, the changes in position may be due to the fibers at the open end of the fiber bundle "waving" as fluid flows past them. In some cases, the calibration is performed in real time.

In illustrative implementations, the calibration involves a time-of-flight ("ToF") sensor taking time-of-flight measurements. For example, the ToF sensor may comprise a streak camera, SPAR (single-photon avalanche diode) camera, or interferometric sensor.

In the calibration, a pulse train of infrared light is emitted. Each pulse is delivered to the scene or to the open end of the fiber bundle in such a way that the time at which light from a given pulse enters the front end of a given fiber directly correlates to the position of the front end (scene-side end) of a given fiber. The fibers in the bundle have equal lengths, and thus the propagation time for light to transit through the fibers is equal for all of the fibers, within the time resolution of the ToF sensor. The ToF sensor images the back end of the fiber bundle, and detects the time at which light that transits a given fiber reaches the ToF sensor. The time of arrival at the ToF sensor, for light from a given pulse that transits a given fiber, directly correlates to the position of the front end (scene-side end) of a given fiber.

In illustrative implementations, the pulse train may be delivered in a number of ways, in order to ensure that the time at which light reflecting from a given fiber directly correlates to the position of the front end (scene-side end) of a given fiber.

For example, in some cases, the light pulses pass though diffusers that produce wavefronts that sweep across the front ends of the fibers. For some pulses, a vertically oriented wavefront sweeps horizontally. For other pulses, a horizontally oriented wavefront sweeps vertically. The time at which the wavefront sweeps past the front end of a given fiber directly correlates to the position of the front end of the given fibers.

Or, for example, laser pulses may be delivered to the scene through fibers in the fiber bundle.

In some cases, a set of fibers deliver laser pulses one at a time, such that only one fiber at a time delivers a laser pulse.

Again, the time at which light from a given pulse reaches the front end of a given fiber directly correlates to the distance of between the front end of the given fiber and the front end of the fiber that delivered the pulse (the "delivering fiber"). The pulse may travel from the tip of the delivering fiber to the tip of a given fiber by reflecting from the scene, or by scattering directly from the front end of the delivering fiber to the front end of the given fiber. In either case, the time at which this light reaches the front ends of the other fibers varies, depending on the distance between the delivering fiber and the other fibers. The greater the distance between the front end of the delivering fiber and the front end of a given fiber, the more time elapses before the light (from a pulse that was delivered by the delivering fiber) enters the front end of the given fiber.

In some cases, multiple fibers deliver a single pulse to the scene at the same time. In that case: (a) a single laser pulse causes a given fiber to receive reflections from light that has been delivered to the scene by multiple fibers; and (b) the time pattern of the reflections that reach the front end of the given fiber encodes information about the distance between the front end of the given fiber and the front ends of each of the delivering fibers. For example, if the delivering fibers are each at a different distance from the given fiber, then the reflections from a pulse delivered by the delivering fibers will reach the given fiber at different times. Based on time signatures measured for the reflections, a computer calculates the distance between the front end of the given fiber and the front end of other fibers in the bundle. An advantage of delivering each pulse through multiple fibers is that doing so tends to speed up the calibration process.

The description of the present invention in the Summary and Abstract sections hereof is just a summary. It is intended only to give a general introduction to some illustrative implementations of this invention. It does not describe all of the details and variations of this invention. Likewise, the descriptions of this invention in the Field of Technology section is not limiting; instead it identifies, in a general, non-exclusive manner, a technology to which exemplary implementations of this invention generally relate. Likewise, the Title of this document does not limit the invention in any way; instead the Title is merely a general, non-exclusive way of referring to this invention. This invention may be implemented in many other ways.

BRIEF DESCRIPTION OF THE DRAWINGS

In FIG. 4, infrared light for calibration is delivered via the fiber bundle. In FIG. 5, infrared light for calibration is delivered via two diffusers, and not via the fiber bundle.

The above Figures (except for FIGS. 12A and 12B) show illustrative implementations of this invention, or provide information that relates to those implementations. However, this invention may be implemented in many other ways.

DETAILED DESCRIPTION

Open End of Fiber Bundle

Figure 1:
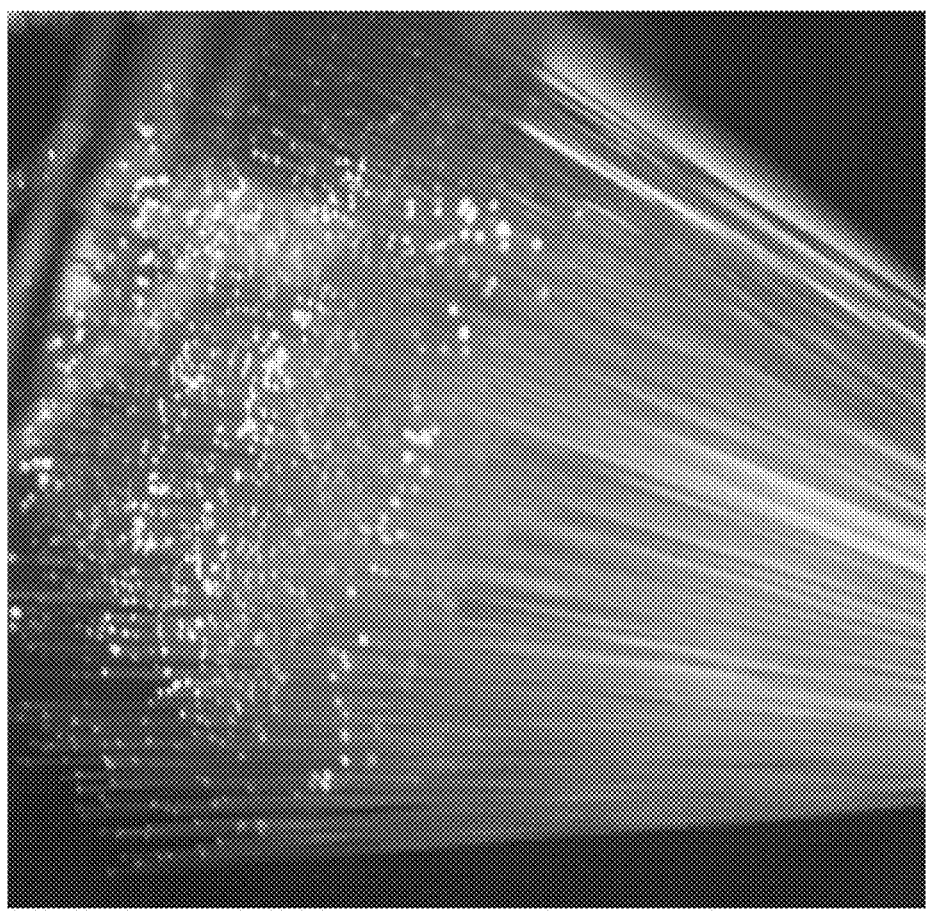
FIG. 1 shows the open end of an incoherent bundle of optical fibers.

FIG. 1 is a photograph that shows an open end of an incoherent bundle of optical fibers, in an illustrative implementation of this invention. In FIG. 1, the optical fibers spread out from right to left, such that the density of fibers (number of fibers per unit area) is higher on the right side than on the left side of photograph. At the open end shown in FIG. 1, the fibers are not constrained by an outer sheath that would prevent them from spreading out. At a point further to the right (not shown in FIG. 1, because beyond the border of the photograph), the optical fibers are tightly packed inside an outer sheath. The fibers extend beyond this outer sheath, to form the open end of the bundle. In the open end of the bundle, the flexible fibers spread out and bend in different directions, such that their relative positions vary over the open end.

In the example shown in FIG. 1, the fiber bundle comprises 1,100 multi-mode, poly(methyl methacrylate) (PMMA) fibers. Each fiber has a 300 μm diameter. The bundle is packed on the camera end and is open on the scene end. Alternatively: (a) the fibers may comprise a material other than PMMA; (b) the number of fibers in the bundle may greater or smaller than 1,100; and (c) and the diameter of the fibers may be greater or smaller than 300 μm.

The fiber bundle shown in FIG. 1 is incoherent. The relative position of the fibers is not constant over the length of the bundle. At the open end, the fibers bend and change positions relative to each other.

Figure 2:
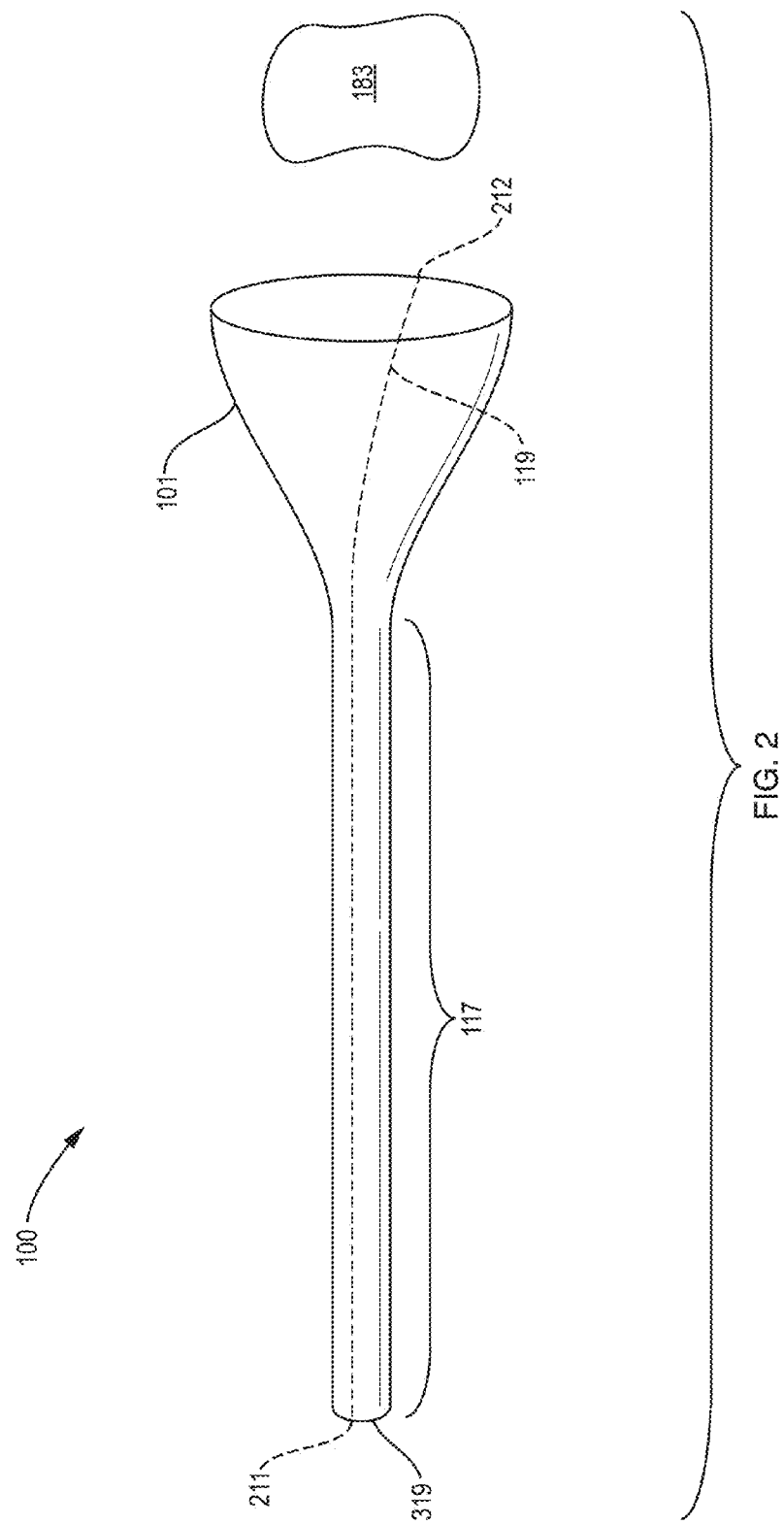
FIG. 2 shows an open-ended bundle of optical fibers.

FIG. 2 shows an open-ended bundle of optical fibers, in an illustrative implementation of this invention. The fiber bundle 100 includes an open end 101 and a back end 319. The open end 101 is at the front of bundle 100 and the back end 319 is at the back of bundle 100, because the open end is optically closer to the scene 183 being imaged than the back end is. The back end 319 is optically closer to the visible light camera 133 and the ToF sensor (e.g., streak camera 125, SPAD camera 145, or interferometric sensor 155) than the open end is.

In FIG. 2, the fiber bundle comprises many (e.g., hundreds or thousands) of optical fibers, including optical fiber 119. The back end 211 of fiber 119 is where fiber 119 terminates at the back of bundle 100. The front end 210 of fiber 119 is where fiber 119 terminates at the front of bundle 100.

In FIG. 2, the fiber bundle 100 includes a sheathed region 117 (also called a "tail"). The sheathed region is behind, and does not include, the open end 101. The sheathed region 117 extends from the open end 101 to the back end 319 of the fiber bundle 100.

The length of the sheathed portion 117 of the fiber bundle may vary, depending on the particular implementation of this invention. For example, in some cases, the sheathed portion 117 is between 1 centimeter and 1 meter long, or between 1 meter long and 3 meters long, or between 3 meters and 10 meters long, or between 10 meters and 10 kilometers long. In many implementations, the length of the sheathed portion 117 does not prevent ToF calibration of the imaging system. This is because: (a) the time that it takes for the pulse of light to travel through the length of the sheathed portion 117 is almost identical for all the fibers in the bundle; and (b) thus, increasing the length of the sheathed section 117 only adds an equal delay to all of the time signatures. Conventional dispersion compensation methods may be employed to compensate for increased time blue due to a longer fiber bundle.

In some use scenarios, a long sheathed portion 117 has many advantages. For example, the long sheathed continuation of the optical fibers may facilitate imaging in oil wells deep underground, or far inside a pipe system in a refinery.

Shuffled Image

The open ended, incoherent bundle of optical fibers shown in FIG. 1 has many advantages, including flexibility. The open end may be inserted into, and image, a wide variety of irregular cavities, of different shapes and sizes.

However, the relative position of the front ends of the fibers (which face the scene) is not the same as the relative position of the back ends of the fibers (which face the camera). In other words, the incoherent fiber bundle "shuffles" the light from the scene, such that the camera which is imaging through the bundle captures a "shuffled" image of the scene.

Figure 3:
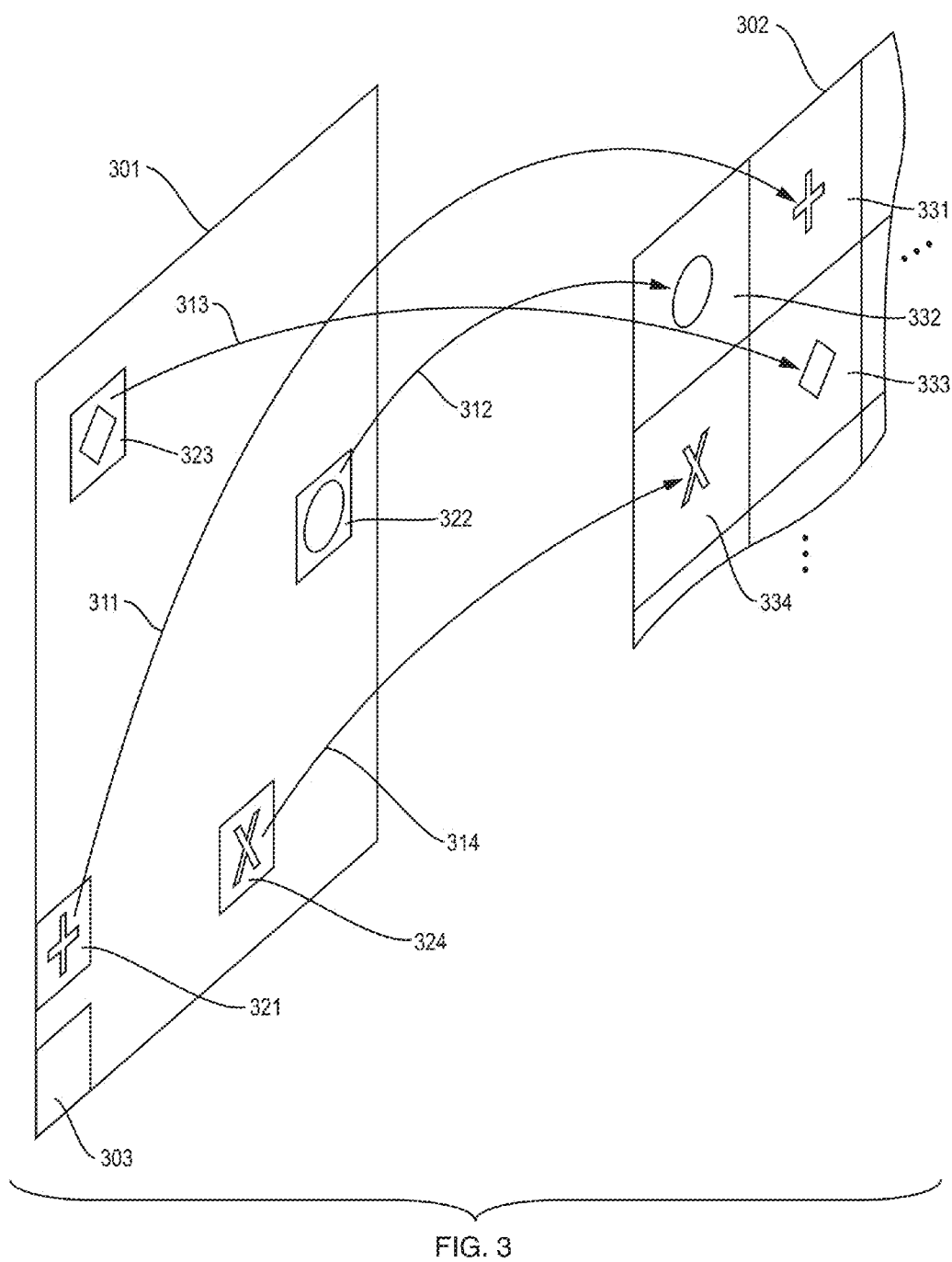
FIG. 3 is a conceptual diagram that illustrates how an incoherent bundle of optical fibers "shuffles" light from a scene.

FIG. 3 is a conceptual diagram that illustrates how an incoherent bundle of optical fibers "shuffles" light from a scene, in an illustrative implementation of this invention. In FIG. 3, a set of four optical fibers are symbolized by arrows 311, 312, 313, 314. These optical fibers terminate near scene regions 321, 322, 323, 324, respectively, and transmit light from those scene regions to regions 331, 332, 333, 334, respectively, in an image sensor 302 of a camera. However, the relative positions of the fibers at the scene end are not the same as the relative positions of the fibers at the camera end. This causes the scene 301 to appear "shuffled" to the camera.

Delivery of Light

Figure 4:
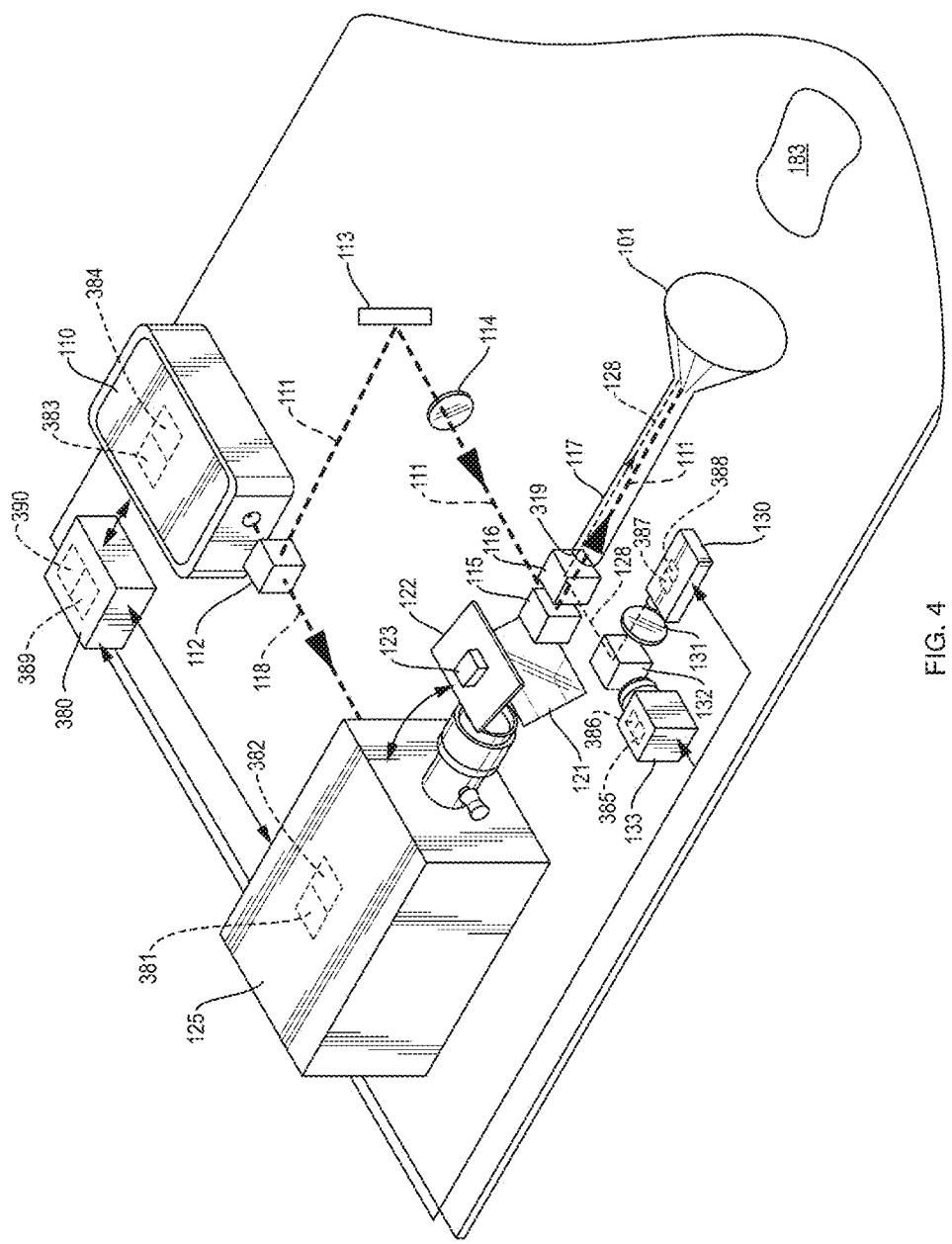
FIG. 4 and FIG. 5 each show an imaging system, in which a streak camera gathers time-of-flight data.
Figure 10:
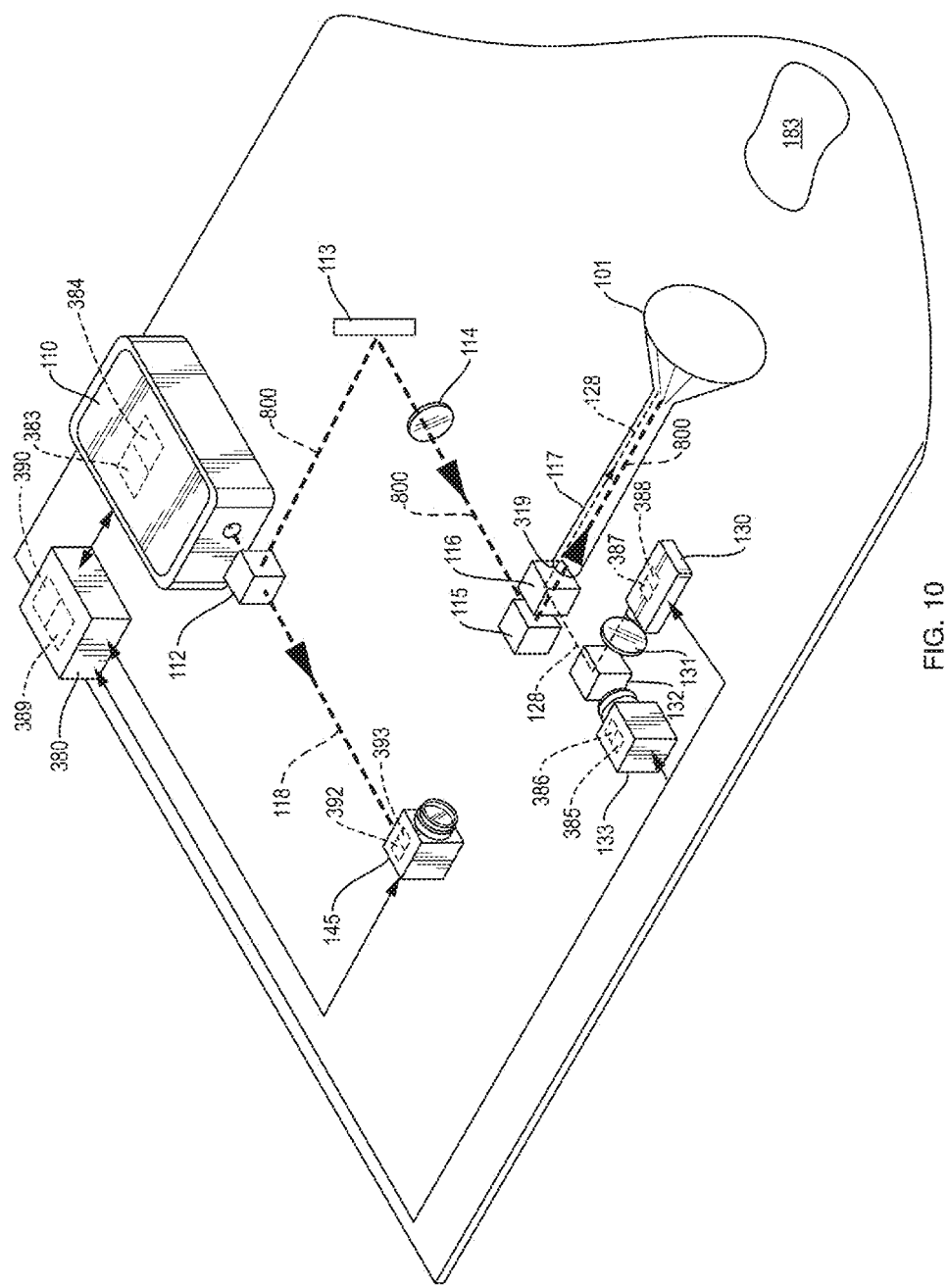
FIG. 10 shows an imaging system, in which a SPAD camera gathers time-of-flight data.
Figure 11:
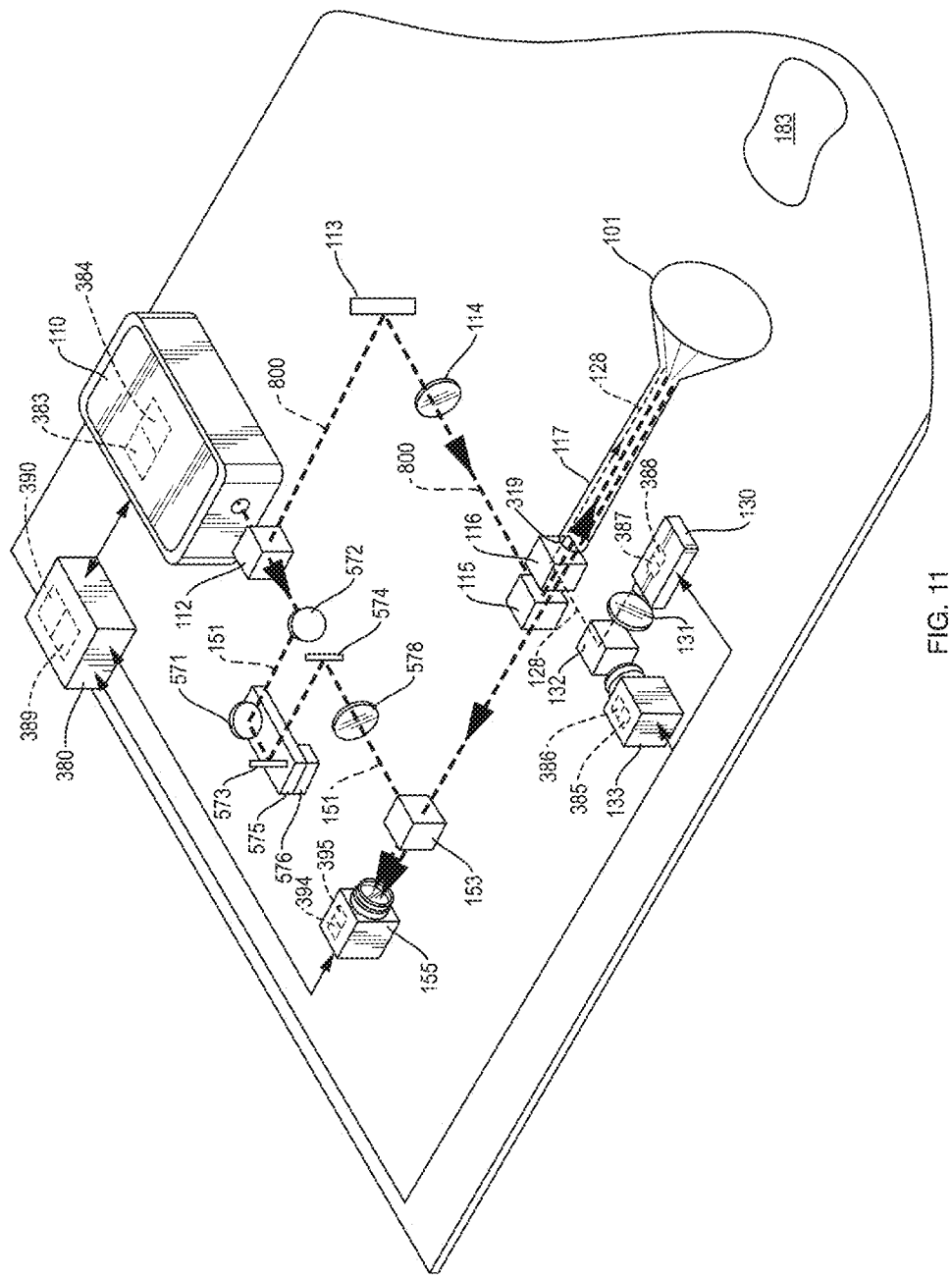
FIG. 11 shows an imaging system, in which an interferometric sensor gathers time-of-flight data.

In some implementations of this invention, optical fibers in the bundle both (a) deliver near-infrared (NIR) light to the scene for calibration purposes and (b) deliver visible light to the scene for purposes of illuminating the scene to enable a digital camera to capture visible light images of the scene. FIGS. 4, 10, and 11 show examples in which both the NIR light for calibration and the visible light for imaging are delivered to the scene via the fiber bundle.

Figure 5:
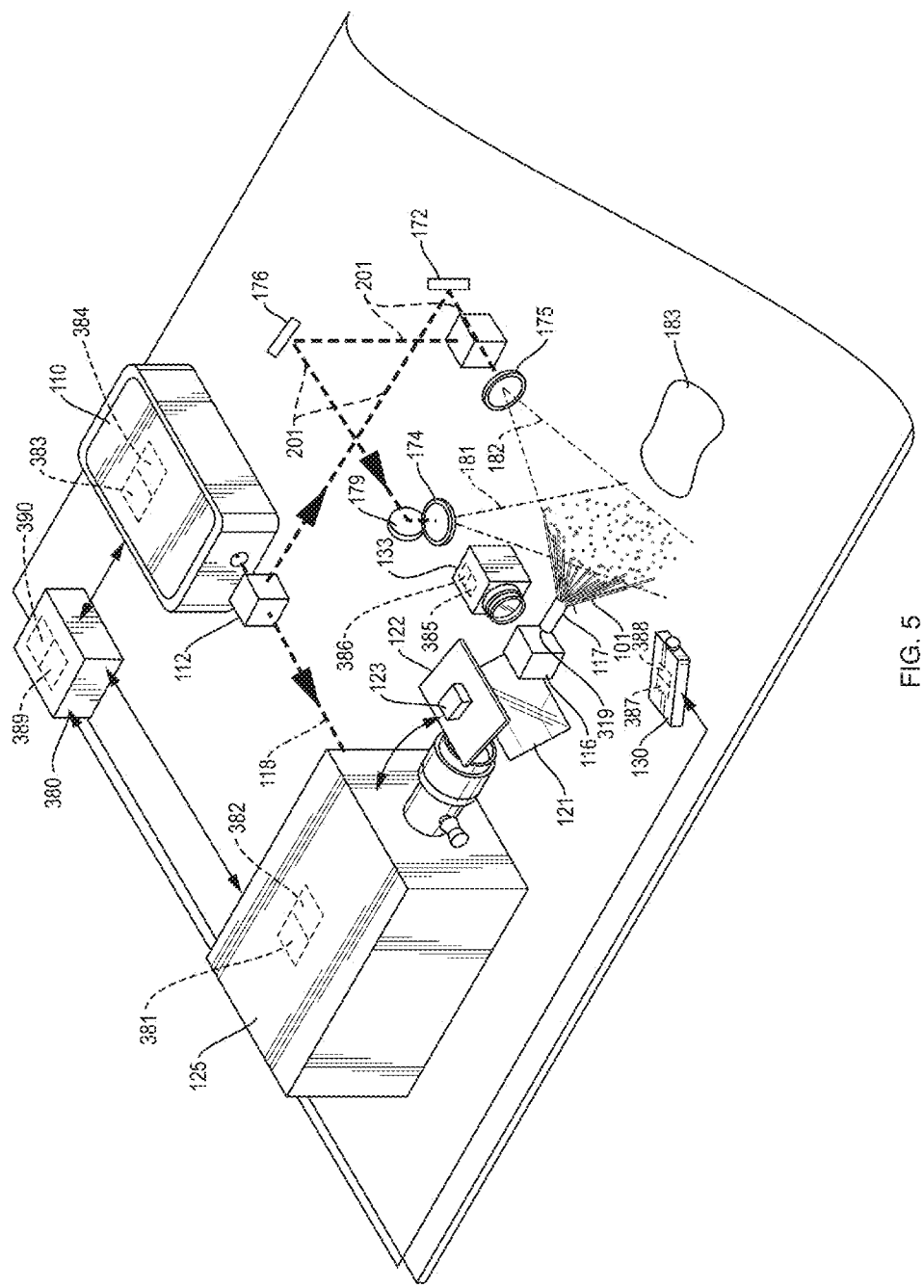

In other implementations of this invention: (a) NIR light for calibration is delivered to the scene via diffusers and is not delivered via the fiber bundle; and (b) visible light for imaging is delivered to the scene via the fiber bundle. In these implementations, NIR laser light for calibration may be delivered to the scene in such a manner that the NIR light strikes the fiber bundle at an angle that is substantially off-axis. FIG. 5 shows an example of this.

Calibration to Deshuffle Images

In illustrative implementations of this invention, calibration is performed in order to "de-shuffle" the image captured by the visible light camera.

In illustrative implementations, the calibration may be made repeatedly during normal operation of the imaging system, to adjust for changes in position of the flexible fibers at the open end (scene end) of the bundle over time. In some cases, the calibration is performed in real time.

In illustrative implementations, the calibration involves a ToF sensor taking time-of-flight measurements. In some implementations, the ToF sensor comprises a streak camera 125, SPAD camera 145, or interferometric sensor 155.

For the hardware configurations shown in FIGS. 4, 10 and 11, the ToF calibration may be performed in at least two ways.

In the first approach (the "dedicated fibers approach"), a set of dedicated fibers that bend outward slightly deliver laser pulses to the scene. (For example, a set of dedicated fibers 901 is shown in cross-section in FIG. 9B). The dedicated fibers are located at or near the perimeter of the fiber bundle. For example, in some implementations, the number of dedicated fibers is an integer greater than or equal to two and less than or equal to one hundred.

In a simple version of the dedicated fibers approach, one dedicated fiber at a time delivers a laser pulse to the scene. (As used herein, a "delivering fiber" is a fiber that delivers a laser pulse such that the pulse exits the front end of the fiber.) In this simple version, a pulse delivered by the dedicated fiber travels to other fibers by reflecting back from the scene or by scattering directly from the front end of the delivering fiber to the front ends of the other fibers. The reflected or scattered pulse enters the front ends of the fibers and travels through the fibers to the ToF sensor. The length of the fibers in the bundle is equal, and thus the amount of time that it takes for light to travel from the front end to the back end of each fiber is equal, within the time resolution of the ToF sensor. However, the time at which the light reaches the ToF sensor differs from fiber to fiber. This is because the distance that the reflected or scattered light pulse travels from the delivering fiber to the other fibers differs from fiber to fiber. The distance that the reflected or scattered light travels progressively increases for fibers further from the delivering fiber. Thus, the time of arrival at the ToF sensor, of a reflected or scattered pulse that enters the front end of a given fiber and passes through the given fiber (from the front end to the back end of the given fiber), correlates with the distance between the front end of the given fiber and the front end of the delivering fiber.

In this simple version, the dedicated fibers deliver the pulsed laser light one at a time, until all of the dedicated fibers deliver the pulsed light. In this simple version, the number of laser pulses delivered for calibration may equal the number of fibers in the fiber bundle. The ToF sensor takes measurements, during the laser pulses, that indicate the distance between the front end of a given fiber and the front end of each of the dedicated fibers, respectively.

In another version of the dedicated fibers approach, multiple dedicated fibers deliver pulsed laser light at the same time. For each single laser pulse, a subset of the dedicated fibers delivers the laser pulse. The subset changes over time, such that different subsets of dedicated fibers deliver laser pulses at different times. In some cases, delivering a laser pulse through multiple dedicated fibers at the same time has advantages. For example, doing so may reduce the total amount of laser pulses that are delivered to the scene to achieve a calibration.

In some cases, the open end of the fiber bundle is sufficiently long and the dedicated fibers sufficiently flexible that the positions of the dedicated fibers relative to each other may not be estimated from prior knowledge with reasonable accuracy. In other cases, the dedicated fibers are sufficiently rigid that the approximate position of the dedicated fibers relative to each other in the open end of fiber bundle is known from prior knowledge.

In the second approach (the "universal approach") all fibers in the bundle deliver light to the scene, but not all at the same time. In this second approach, there are no specially dedicated fibers for delivering laser light to the scene.

In a simple version of the universal approach, only one fiber at a time delivers a laser pulse to the scene. The distance between the single delivering fiber and other fibers is determined, in the same manner as described for the simple version of the dedicated fibers approach.

In another version of the universal approach, a randomly selected subset of the fibers in the bundle delivers the laser light to the scene at any given time. In many cases, each subset consists of a small percentage (e.g., less than 5 percent) of the total number of fibers in the bundle. In many cases, each subset consists of multiple (e.g., ten or more) fibers. The subsets change over time, such that different subsets of the fibers deliver the laser pulses at different times. Again, an advantage of delivering a laser pulse through multiple fibers at the same time is that it may reduce the total amount of laser pulses that are delivered to the scene to achieve a calibration.

In a version of the dedicated fibers approach and a version of the universal approach (described above), multiple fibers deliver a single laser pulse, which then travels to the front ends of fibers ("receiving fibers") by scattering or by reflection from the scene. In these versions, the temporal light pattern for a given receiving fiber that transmits the light to the ToF sensor is a superposition of a set of temporal light patterns. Each pattern in the superimposed set is the temporal light pattern that would occur for the receiving fiber if only one delivering fiber delivered the laser pulse. By recording data for multiple different subsets of delivering fibers, the superimposed contributions of the delivering fibers may be disentangled, and the distance between a given receiving fiber and each of the delivering fibers, respectively, may be determined.

A wide variety of algorithms may be employed for this purpose. For example, the disentangling algorithm may, for a given receiving fiber, take into account the global maximum of light intensity in the temporal pattern of light intensity for the given receiving fiber in response to a single laser pulse. The global maximum is treated as corresponding to the shortest distance between the front end of the given receiving fiber and the front end of a delivering fiber (or the front ends of a set of delivering fibers that are all at the same shortest distance). Or, for example, the disentangling algorithm may, for a given receiving fiber, take into account a set of local maxima in the temporal pattern of light intensity for the given receiving fiber in response to a single laser pulse. The set of local maxima includes more than one local maxima. Each local maximum is treated as corresponding to a distance between the front end of the given receiving fiber and the front end of a nearby delivering fiber (or the front ends of a group of nearby delivering fibers that are all at that same distance). Or, for example, the disentangling algorithm may take into account the time at which an avalanche of a SPAD sensor occurs for a given receiving fiber. The algorithm may treat that time as corresponding to the shortest distance between the front end of the given receiving fiber and the front end of a delivering fiber (or front ends of a set of delivering fibers that are all at the same shortest distance). In some cases, a computer performs a temporal deconvolution algorithm to estimate, based on measured time signatures, the position of the front ends of a set of fibers in the fiber bundle. In some cases, a computer takes prior knowledge into account when estimating, based on measured time signatures, the position of the front ends of a set of fibers in the fiber bundle. For example, the prior knowledge may comprise knowledge of the statistical distribution of the positions of the front ends of the fibers, such as whether the distribution is Gaussian. Or, for example, the prior knowledge may comprise knowledge of the average distance between front ends of the fibers.

In some cases, preliminary calculations determine the position of a subset of the fibers relative to each other, and these calculated positions serve as landmarks that facilitate calculations of the positions of other fibers. For example, in some cases, a subset of the fibers in the bundle (e.g., the dedicated fibers or another subset of all of the fibers) delivers laser light to the scene one at a time, and the ToF sensor takes measurements. A computer then takes the ToF measurements for these laser pulses as input, and calculates the position of the front ends of the fibers in the subset relative to each other. Once the position of the front ends of the fibers in the subset relative to each other are calculated, they serve as landmarks in later steps. For example, a computer may perform further calculations, based on the calculated landmarks and the ToF measurements already gathered in the one-at-a-time deliveries of laser pulses, to determine the positions of the front ends of the remaining fibers. Or, once the landmarks are calculated, additional laser pulses may be delivered, such that each laser pulse is delivered by multiple fibers at the same time. A computer may then calculate, based on the landmarks and ToF measurements taken for the additional pulses, the positions of the remaining fibers.

In some implementations of this invention, a digital mirror device (DMD) selects one or more fibers for delivering different laser pulses. For example, in the simple versions of the dedicated fiber and universal approaches (discussed above), the DMD selects only one fiber to deliver a single laser pulse. In other versions of the dedicated fiber and universal approaches (discussed above), the DMD selects more than one fiber to deliver each light pulse. For example, the DMD may select a set of multiple dedicated fibers to deliver a single pulse, and change the set over time, such that different sets of the dedicated fibers are selected for different laser pulses. Or, for instance, the DMD may select a random subset of fibers to deliver a single pulse, where the subset comprises many fibers that are still a small minority of the fibers in the bundle. The DMD may change the random subset over time, such that different subsets of the fibers in the bundle are selected for different laser pulses. The DMD may select one or more fibers to deliver a laser pulse to the scene, by adjusting micromirrors in the DMD such that the laser pulse reflects to and enters the back end of the selected fiber or fibers and such that none (or only an insubstantial amount) of the laser pulse reflects to and enters the back end of the remaining fibers in the fiber bundle.

A third approach for ToF calibration (the "sweeping wavefront approach") involves illuminating a scene with multiple wavefronts that sweep across the open end of the bundle as they propagate through space. In this third approach, light from a sweeping wavefront enters the front end of different fibers at different times, and the different times are indicative of the positions of the different fibers along an axis parallel to the direction of propagation of the wavefront. The fibers are of equal length, and thus the transit time for light to pass through a fiber is equal for all of the fibers. Transit through a fiber thus merely adds a time delay that is equal for all of the fibers. A time signature may indicate the time at which light from a sweeping wavefront reaches the ToF sensor via a given fiber. This time signature correlates to the position of the front end of a given fiber along an axis parallel to the direction of propagation of the sweeping wavefront. FIG. 5 shows an example of the sweeping wavefront approach.

In each of the three approaches discussed above (dedicated fiber, universal, and sweeping wavefront), the open end of a given fiber may be positioned or oriented such that light from a delivered laser pulse does not enter the front end of the fiber. In that case, the given fiber may be effectively "lost", such that (i) the position of the front end (facing the scene) of the given fiber is not computed, and (ii) a computer does not determine a map from the position of the front end (facing the scene) of the given fiber to the position of the given fiber in the back end of the bundle.

Figure 9A:
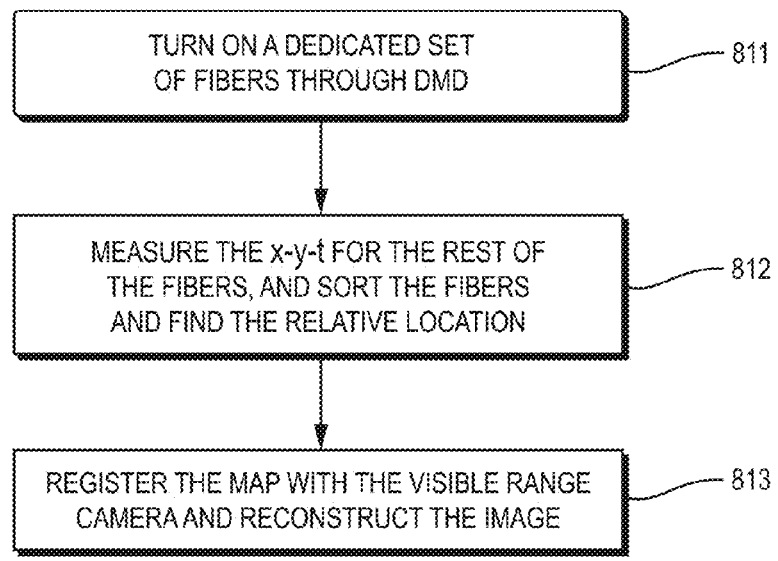
FIG. 9A shows another flowchart for determining the location of shuffled optical fibers.
Figure 9B:
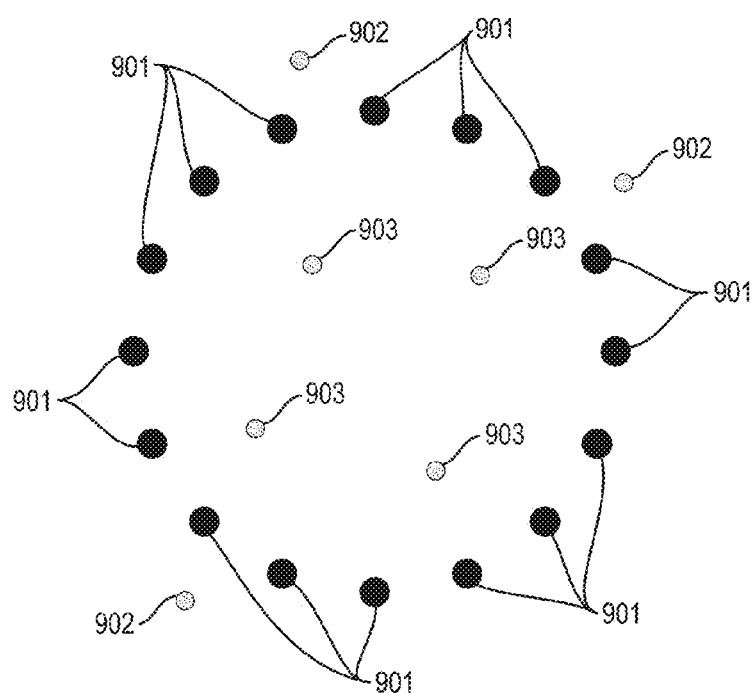
FIG. 9B shows a cross-sectional view of an open end of an optical fiber bundle.

Furthermore, in the first approach discussed above (dedicated fiber), the front end of a given fiber may be positioned outside a perimeter line that intersects the centroids of each of the dedicated fibers, as illustrated in FIG. 9B. This may make it difficult to accurately localize the given fiber (i.e., to accurately determine the location of the front end of the given fiber.)

In some cases, a subset of the fibers or a subset of regions in the scene are not mapped (e.g., due to the fibers breaking, or due to missing data, or due to any other problem described in the preceding two paragraphs). In these cases, the missing data may be interpolated by conventional techniques such as by image inpainting.

Furthermore, in some cases, the front ends of the fibers are sufficiently dispersed that the fibers do not capture light from some regions of scene. For example, in FIG. 3, none of the fibers capture light from region 303 of scene 301. This missing data, too, may be interpolated by conventional techniques such as by image inpainting.

Streak Camera

In some cases, the ToF calibration involves a streak camera capturing streak images. In each streak image, one axis of the image corresponds to distance along a line of the scene, and the other axis of the image corresponds to time. Thus, in some cases, each individual streak image records a single line of the scene, and how light intensity for that line changes over time.

In some implementations, the streak camera captures each streak image by a process that includes the following steps: Light from a scene passes through a slit and strikes a photocathode, which emits electrons. The electrons are accelerated by accelerating electrodes toward a phosphor screen. When the electrons hit the phosphor screen, the screen emits light that is captured by an image sensor. During the capture of a single streak image, while the accelerated electrons travel toward the phosphor screen, a set of sweep electrodes expose the electrons to an electrical field that varies, causing the electrons to be deflected by varying amounts and to strike the phosphor screen in different positions. Thus, light from a single point in the scene forms a streak in the streak image, because the electrons corresponding to that point are deflected by different amounts during the capture of the streak image.

FIG. 4 shows an imaging system, in which a streak camera gathers time-of-flight ("ToF") data, in an illustrative implementation of this invention. In FIG. 4, the NIR light for calibration is delivered to the scene via the fiber bundle.

In the example shown in FIG. 4, the fiber bundle has an open end 101 and a sheathed portion 117. The open end 101 of the fiber bundle is closer to the scene than the back end 319 is, and thus the open end 101 is in front of the back end 319. The back end 319 of the fiber bundle is optically closer to the visible light camera 133 and the streak camera 125 than the open end 101 is.

In FIG. 4, a streak camera 125 and a visible light camera 133 both image the back end 319 of the bundle of optical fibers. For example, the streak camera 125 may comprise a Hamamatsu® C5680 streak camera with a time resolution of 2 picoseconds. The visible light camera 133 captures 2D digital images of visible light (i.e., light in the wavelength range of 390 nm to 700 nm).

In the so-called tail region 117 of the fiber bundle, an outer sheath surrounds the optical fibers as a group. At the open end 101 of the fiber bundle, the optical fibers as a group are not surrounded by an outer sheath and are free to spread out.

In FIGS. 4, 5, 10 and 11, the bundle of optical fibers is incoherent and thus "shuffles" the light from the scene.

In FIG. 4, a solid-state light source 130 emits visible light that travels to the scene via path 128. Light that propagates along path 128 passes through lens 131, then travels to beamsplitter 132, then travels to beamsplitter 116, then enters the back end of the fibers (at the back end 319 of the fiber bundle), then travels through the sheathed portion 117 of the fiber bundle, then travels through the open end 101 of the fiber bundle, then travels to nearby scene 183. The visible light then reflects from scene 183 to the visible light camera 133 in the reverse direction along path 128, except that beamsplitter 132 steers the light to camera 133 (instead of back to light source 130). In some cases, the solid-state light source 130 comprises one or more light emitting diodes (LEDs) or laser diodes.

Because the fiber bundle is incoherent, the visible light camera 133 captures a "shuffled" image of the scene, in which the relative positions of regions of the image are not the same as the relative positions of the corresponding regions of the scene.

In order to "unshuffle" the image, ToF calibration is performed. The calibration determines where the end of each respective fiber is located in the open end of the bundle ("localizes" the fibers). For this calibration, a laser 110 and a streak camera 125 are employed.

In the example shown in FIG. 4, either the dedicated fibers or universal approach to calibration may be performed, as described above. For example, the imaging system shown in FIG. 4 may perform a one-fiber-at-a-time version or a multiple-fibers-at-a-time version of either approach (dedicated fibers or universal), as discussed above.

The laser 110 emits a pulse train of light. In some cases, the pulsed light is NIR light. Illuminating the scene with NIR light for calibration has many practical advantages. For example, it tends to prevent cross-talk between (i) the visible light provided for visible light imaging, and (ii) the light provided for calibration.

For each pulse of laser light, a beamsplitter 112 splits the pulse, such that a portion of laser pulse travels in path 118 and another portion of the laser pulse travels in path 111. The portion of the laser pulse that moves along path 118 reaches the streak camera 125, and triggers the streak camera 125 to capture a streak image during a time period in which light from the laser pulse reaches the streak camera 125. Thus, the portion of the light pulse that travels along path 118 causes the laser pulse to be synchronized with the capture of streak images by the streak camera.

The portion of a light pulse that moves along path 111 travels to a digital micromirror device (DMD) 113, then through lens 114, then to a beamsplitter 115, then to a beam splitter 116, then enters the back end 319 of the fiber bundle, then travels through the sheathed portion 117 of the fiber bundle, then travels through the open end 101 of the fiber bundle, then travels to scene 183.

The DMD 113 includes a set of many tiny actuators, where each actuator in the set comprises a pair of electrodes that control orientation of a micromirror by electrostatic force. These tiny actuators adjust the orientation of micromirrors in the DMD, such that the micromirrors reflect the laser pulse to selected fibers of the fiber bundle. The DMD 113 thus reflects the laser pulse such that it enters the back end of the selected fibers and such that none (or only an insubstantial amount) of the light from the laser pulse enters the back end of the remaining fibers in the fiber bundle. For example, in some cases, if only one fiber is selected to deliver the laser pulses, then the DMD 113 reflects the laser pulse such that it enters the back end of only the selected fiber. Also, in some cases, if a set of multiple fibers are selected to deliver the laser pulses, then the DMD 113 reflects the laser pulse such that it enters the back ends of only the selected set of multiple fibers.

In FIG. 4, the streak camera 125 records streak images that indicate the time at which NIR light reaches the ToF sensor via a given fiber. This time signature correlates to the distance between the front end of the given fiber and the front end of one or more fibers that delivered the NIR light.

In illustrative implementations, a single steak image captures visual information about (a) a horizontal line of the back end of the fiber bundle and (b) how intensity measured for that line changes over a time duration following a laser pulse.

Two mirrors 121, 122 steer light from beamsplitter 115 to the streak camera 125.

In order to capture information about both 2D dimensions (x and y) of the back of the fiber bundle, an actuator 123 changes the orientation of mirror 122 such that, at each different orientation of mirror 122, a different horizontal line of the back end of the fiber bundle is imaged. Each different horizontal line is at a different vertical height (y-position). Thus, by gathering information about multiple horizontal lines, information about the y-dimension of the back end of the fiber bundle is obtained.

In FIGS. 4, 5, 10, and 11, a ToF sensor (e.g., streak camera 125, SPAD camera 145, interferometric sensor 155), takes measurements of the time at which each given laser pulse arrives at the ToF sensor via different fibers in the fiber bundles. The arrival times are different for different fibers, except where receiving fibers happen to be at the same distance from the delivering fiber. Based on these measurements, a computer 380 calculates the position of the fibers, relative to each other, at the open end of the bundle. Based on these calculated relative positions of the front ends of the fibers, computer 380 calculates a map that maps from the relative positions of the front ends of the fibers to the relative positions of the back end of the fibers. Or, the computer 380 may compute a map that maps (i) from a scene region imaged by a given fiber (ii) to a region of an image sensor that corresponds to the given fiber. In either case, based on the map, computer 380 "unshuffles" the image captured by the visible light camera.

In FIGS. 4, 5, 10, and 11, computer 380 controls, and interfaces with, microcontrollers (e.g., 381, 383, 385, 387, 392, 394). Computer 380 stores data in, and accesses data from, one or more memory devices (e.g., 389).

In the examples shown in FIGS. 4, 5, 10, and 11, the laser 110 may comprise a Ti:sapphire laser (also known as a titanium-sapphire laser) that produces ultrashort pulses. For example, each of the pulses may have a duration of (a) between 1 nanosecond and 1 picosecond, (b) between 1 picosecond and 1 femtosecond, or (c) between 1 femtosecond and 1 attosecond. Furthermore, in FIGS. 4, 5, 10, and 11, each lens (e.g., 114, 131, 578) may itself comprise a compound lens or system of lens, and may magnify or minify such that the light pattern presented to the next stage of the optical system is properly sized.

FIG. 5 shows another imaging system, in which a streak camera gathers time-of-flight data, in an illustrative implementation of this invention. In FIG. 5, however, the NIR light for calibration is not delivered via the fiber bundle. Instead, the NIR light for calibration is delivered by two diffusers that emit propagating wavefronts that sweep across the front ends of the fibers.

In FIG. 5, the NIR light for calibration is delivered via two diffusers 174, 175, and not via the fiber bundle. The laser 110 emits a pulse train of NIR light. Some pulses in the train pass through diffuser 174 and other pulses in the pulse train pass through diffuser 175. However, each individual pulse passes through only one of these two diffusers. Beam splitter 560 is switchable and determines whether a given pulse of light passes through diffuser 174, or whether it passes through diffuser 175 instead. When a pulse of laser light passes through the first diffuser 174, a first wavefront 181 is created. When a pulse of laser light passes through the second diffuser 175, a second wavefront 182 is created. The first and second wavefronts are spherical. However, the radius of the sphere is sufficiently large that the first and second wavefronts are each approximately planar. The second wavefront (the "x-wavefront") 182 is approximately vertical and sweeps across the front ends of the fibers in a horizontal direction (the "X-sweep") as the second wavefront propagates through space. The first wavefront (the "y-wavefront") 181 is approximately horizontal and sweeps across the front ends of the fibers in a vertical direction (the "Y-sweep") as the second wavefront propagates through space.

The time at which light from an X-sweep enters the front end of a given fiber correlates to the x-coordinate of the given fiber. The time at which light from a Y-sweep enters the front end of a given fiber correlates to the y-coordinate of the given fiber. The fibers are of equal length, within the time resolution of the streak camera 125. Thus, the time of arrival, at the streak camera 125, of light from the X-sweep that transits a given fiber correlates to the x-coordinate of the front end of the given fiber. Similarly, the time of arrival, at the streak camera 125, of light from the Y-sweep that transits a given fiber correlates to the y-coordinate of the front end of the given fiber. For purposes of this paragraph, an x-coordinate is Cartesian coordinate that indicates horizontal position and a y-coordinate is a Cartesian coordinate that indicates vertical position.

In FIG. 5, a laser 110 emits pulses of NIR laser light. For each pulse of laser light, a beamsplitter 112 splits the pulse, such that a portion of laser pulse travels in path 118 and another portion of the laser pulse travels in path 201. The portion of the laser pulse that moves along path 118 reaches the streak camera 125, and triggers the streak camera 125 to capture a streak image, in the same manner as described for FIG. 4.

In FIG. 5, the portion of a NIR laser pulse that moves along path 201 travels to mirror 172, and then to beamsplitter 560. Beamsplitter 160 splits the light pulse, such that (a) a portion of the pulse passes through diffuser 175 to create wavefront 182; and (b) another portion of the pulse reflects off of mirrors 176 and 179 and passes through diffuser 174 to form wavefront 181.

In FIG. 5, the NIR light reflects or scatters to the fiber tips, and then travels to the streak camera 125 via a path that passes through the open end 101 of the fiber bundle, then through a sheathed portion 117 of the fiber bundle, then through beamsplitter 116. The NIR light then reflects off of two mirrors 121, 122 into the streak camera 125. Again, actuator 123 adjusts the orientation of mirror 122, thereby causing the streak camera to take x-t streak images of different horizontal lines of the back end 319 of the fiber bundle (and thus to scan along the y-axis of the back end 319 of the fiber bundle.

In FIG. 5, a solid-state light source 130 emits visible light that travels directly to and illuminates the scene 183 while digital camera 133 captures images of the back end 319 of the fiber bundle.

In FIG. 5, the visible light reflects from scene 183 and travels to digital camera 133 via a path that passes through the open end 101 of the fiber bundle, then through a sheathed portion 117 of the fiber bundle, then through beamsplitter 116.

In the examples shown in FIGS. 4, 5, 10 and 11, digital camera 133 captures 2D images of visible light.

The following three paragraphs describe a particular embodiment of the configuration shown in FIG. 5. This particular embodiment is merely a non-limiting example; the configuration shown in FIG. 5 may be implemented in many different ways.

In this particular embodiment, a Ti-Sapphire laser beam (400 mW at 780 nm with 80 MHz repetition rate) is split and diffused with two thin polycarbonate diffusers to generate a vertical (X-sweep) and horizontal (Y-sweep) set of sweeping pulses. The same laser triggers the streak camera. The average power that is received by each fiber is roughly 0.5 µW.

In this particular embodiment, the two diffusers are placed 40 cm apart from the optical axis of the fiber bundle so that the horizontal and vertical scanning pulses have an approximately planar wavefront while passing by the fibers. Since the fibers are randomly distributed in the 2D scene plane the camera sees a lossy permuted or "shuffled" image.

In this particular embodiment, since all the fibers are equal in length, if a fiber outputs the pulsed signal later in time in response to a X-sweep pulse (propagating from right to left), this indicates that the fiber is positioned further away to the left.

The preceding three paragraphs describe a particular embodiment of the configuration shown in FIG. 5. This particular embodiment is merely a non-limiting example; this invention may be implemented in many other ways.

In the example shown in FIG. 5, the NIR illumination in the x-wavefront 182 strikes the fiber bundle (101, 117) at an angle is substantially off-axis. Likewise, the NIR illumination in the y-wavefront 181 strikes the fiber bundle (101, 117) at an angle that is substantially off-axis. In the example shown in FIG. 5, the x-wavefront 182 and y-wavefront 181 each strike the fiber bundle at an angle, relative to the central axis of the fiber bundle, that is greater than 45 degrees.

In some implementations, a third diffuser is added. A laser pulse passing through this third diffuser creates a "z-wavefront". The z-wavefront is oriented approximately perpendicular to the x-wavefront and y-wavefront. Also, the z-wavefront sweeps across the front ends of the fibers in a propagation direction that is approximately perpendicular to the propagation directions of the x-wavefront and y-wavefront, respectively. Adding this "Z-sweep" facilitates 3D localization of the fiber tips (i.e., facilitates determining the 3D position of the front ends of the fibers).

Figure 6:
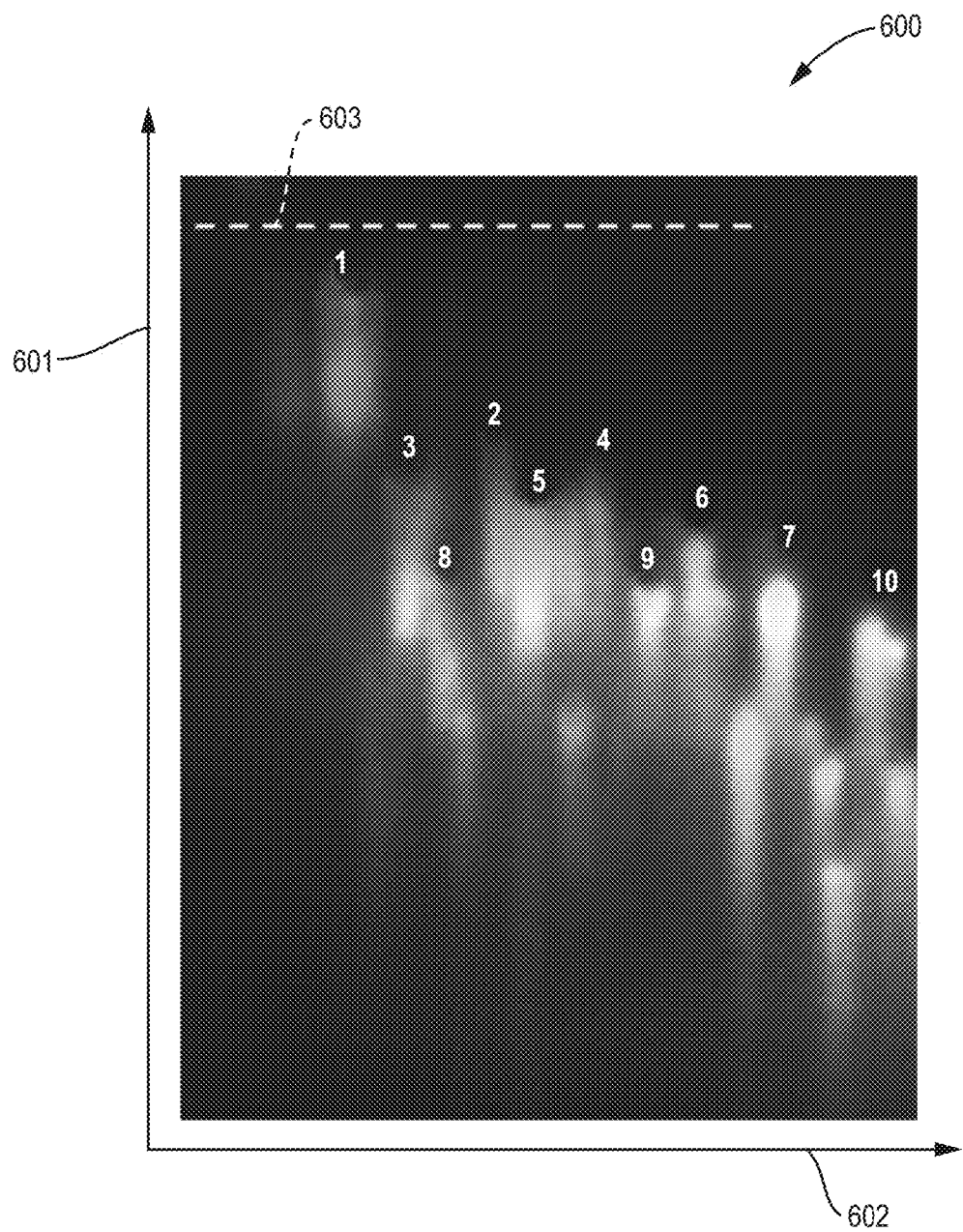
FIG. 6 shows a streak image.

FIG. 6 shows a streak image, in an illustrative implementation of this invention. Streak image 600 captures visual information about (a) a horizontal line of the back end of the fiber bundle and (b) how intensity measured for that line changes over a time duration following a laser pulse.

Moving from right to left in the streak image 600 corresponds to moving along a horizontal line of the back end 319 of fiber bundle 100. Moving from top to bottom in streak image 600 corresponds to moving forward in time. The further that a given point in the streak image 600 is vertically below line 603, the greater the duration of time elapsed between (a) the time symbolized by line 603 and (b) the event that is recorded at that point.

In FIG. 6, there are ten vertical streaks that are vertically nearest the numbers 1 to 10. Each of these vertical streaks, respectively, represents a temporal pattern of light received at the streak camera 125 via a given fiber, in response to a single pulse of laser light reflecting from the scene 183. The topmost point of each of these vertical streaks represents the start in time of that streak and the lowest point in each of these vertical streaks represents the end in time of that streak.

Thus, a vertical line in FIG. 6 measures light intensity at a single position of a horizontal line of the backend 319 of the fiber bundle, as the light intensity at that single position changes over time in response to single pulse of laser light that reflects from the scene.

Unless the context clearly indicates otherwise: (a) a "line" of a streak image means a single column or single row of pixels in the streak image; and (b) a "line" in a scene recorded in a streak image (e.g., a line in the back end of a fiber bundle that is recorded in a streak image) means a region of the scene that corresponds to a single row or single column of the streak image.

In some cases, fibers that are further away from the center axis of the fiber bundle (close to perimeter) have an intensity drop because of the change in the angle of the fibers. A computer may compensate for this non-uniformity by either background subtraction or intensity normalization in consequent frames.

In some implementations, all of the fibers are fed into a single streak image by compressive means.

In some implementations of this invention, a computer calculates data that comprises two or more data cubes. For example, if there are two reference pulses only X and Y location of the fibers may be found but if there are three reference pulses X and Y and Z location of the tips of the fibers may be found in the scene. Each of the data cubes comprises a data set that has at least three dimensions. In the data cube, two of the dimensions are Cartesian coordinates and the third dimension is time. In many cases, the Cartesian coordinates signify 2D position on the back end of a fiber bundle, or 2D position on an image sensor that images the back end of a fiber bundle. The Cartesian coordinates may be data (e.g., data that specifies position of an element of matrix) that maps to ordinary Cartesian coordinates. In the third dimension, time, different positions may correspond to different amounts of time elapsed from or preceding a reference time, which reference time is, or is a constant time interval different from, the time at which a pulse of light or an event triggered by a pulse of light occurs.

In some implementations of this invention (such as in the configuration shown in FIG. 5), a computer calculates both: (a) a data cube based on ToF measurements taken during Y-sweeps (an "x–y–$t_y$ data cube"); and (b) a data cube based on ToF measurements taken during X-sweeps (an "x–y–$t_x$ data cube"). This may be extended to a Z-sweep with an x–y–$t_z$ data cube.

Figure 7B:
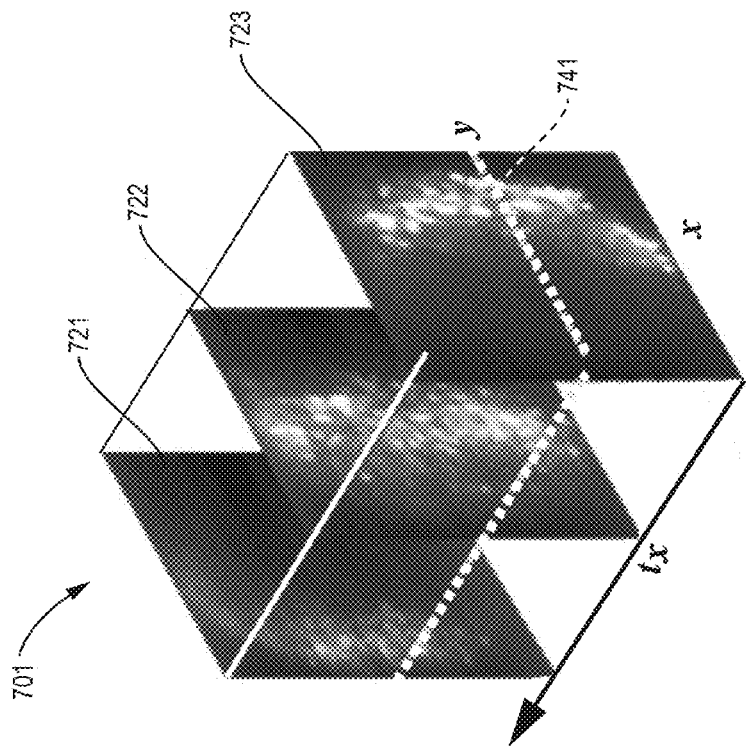
FIG. 7B shows an x-y-$t_x$ data cube.
Figure 7A:
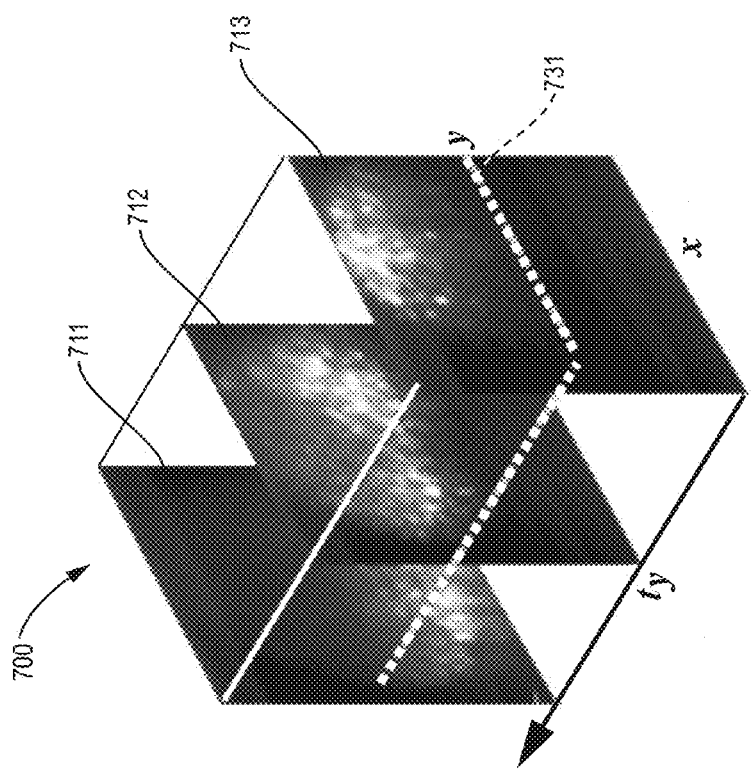
FIG. 7A shows an x-y-$t_y$ data cube.

FIG. 7A is a conceptual diagram of an x–y–$t_y$ data cube, in an illustrative implementation of this invention.

FIG. 7B is a conceptual diagram of an x–y–$t_x$ data cube, in an illustrative implementation of this invention.

In FIGS. 7A and 7B, dotted lines 731, 741 each indicate a slice of the data cube that corresponds to a single x-t streak image captured by a streak cube. Each x-y slice (e.g., 711, 712, 713, 721, 722, 723) represents data corresponding to a 2D digital image of the back end of fiber bundle 100. In some cases, a computer calculates these x-y slices (or the data represented by these x-y slices) from a set of x-t streak images that were captured at different y positions. Data cube 700 is an x–y–$t_y$ data cube captured during a series of Y-sweeps of the scene. Data cube 701 is an x–y–$t_x$ data cube captured during a series of X-sweeps of the scene.

In some implementations, a computer calculates distances between front ends of fibers, based on the maxima of the intensity signal on each x-t column. In some cases, a computer calculates the intensity of each point in the ToF based deshuffled image as an integration of the intensity value of all the points that correlate with a time instance in the entire X-sweep and Y-sweep streak data cubes. In some cases, if both $t_x$ and $t_y$ are measured to be the same within the time resolution of the system for more than one fiber (the fibers that are in ambiguity region), an algorithm sums up the intensity of the measurements for those two fibers instead of overwriting or ignoring one of the fibers.

In some implementations, the permutation (or shuffling) map is a map between back-end coordinates (x-y) (i.e., output coordinates) for each fiber and the open-end coordinates (X-Y) for each fiber (i.e, the front-end or input coordinates for the fiber). In some cases, a computer calculates the permutation map from set of streak images. FIG. 6 shows a sample recorded streak image captured during an X-sweep. This is an x-t slice recorded at a given y of the back-end cross section of the fiber bundle (dotted white line 741 in FIG. 7B). By sorting the bright spots (in the x-t slice in FIG. 6) in time, the fiber positions may be recovered for a given horizontal cross section y. In FIG. 6, the time window of the streak image (the vertical axis) is ~1 ns and the horizontal axis is 1.5 cm that corresponds to the diameter of the fiber bundle at the back-end facing the streak camera. By recording a streak (x-t) image for each y, the data cube is completed. By sorting out the entire peak signals from each fiber in time, X-Y position of each fiber on the open-end is determined. A computer calculates two data cubes (and x–y–$t_y$ data cube and an x–y–$t_x$ data cube) to recover both the front-end coordinates (X and Y) of each fiber. The X-sweep and Y-sweep data cubes may be measured sequentially and individually.

A computer maps the front-end location of each fiber to the back-end location of each fiber. A computer then employs this map to "deshuffle" the shuffled image captured by the visual light camera. That is, based on this map, a computer computationally rearranges the shuffled image (i.e., 2D digital image of the back end 319 of the incoherent fiber bundle 100 captured by the visual light camera 133), such that the relative positions of pixels in the de-shuffled image correspond to the relative positions of points in the scene being imaged.

In some implementations, a computer treats the peak intensity as the time of arrival; however, for longer time blurs temporal deconvolution may be employed to estimate the temporal signatures of each fiber. In some cases, the time blur depends on the FWHM (full width at half maximum) of the exponential decay relative to the entire time window.

Figure 8:
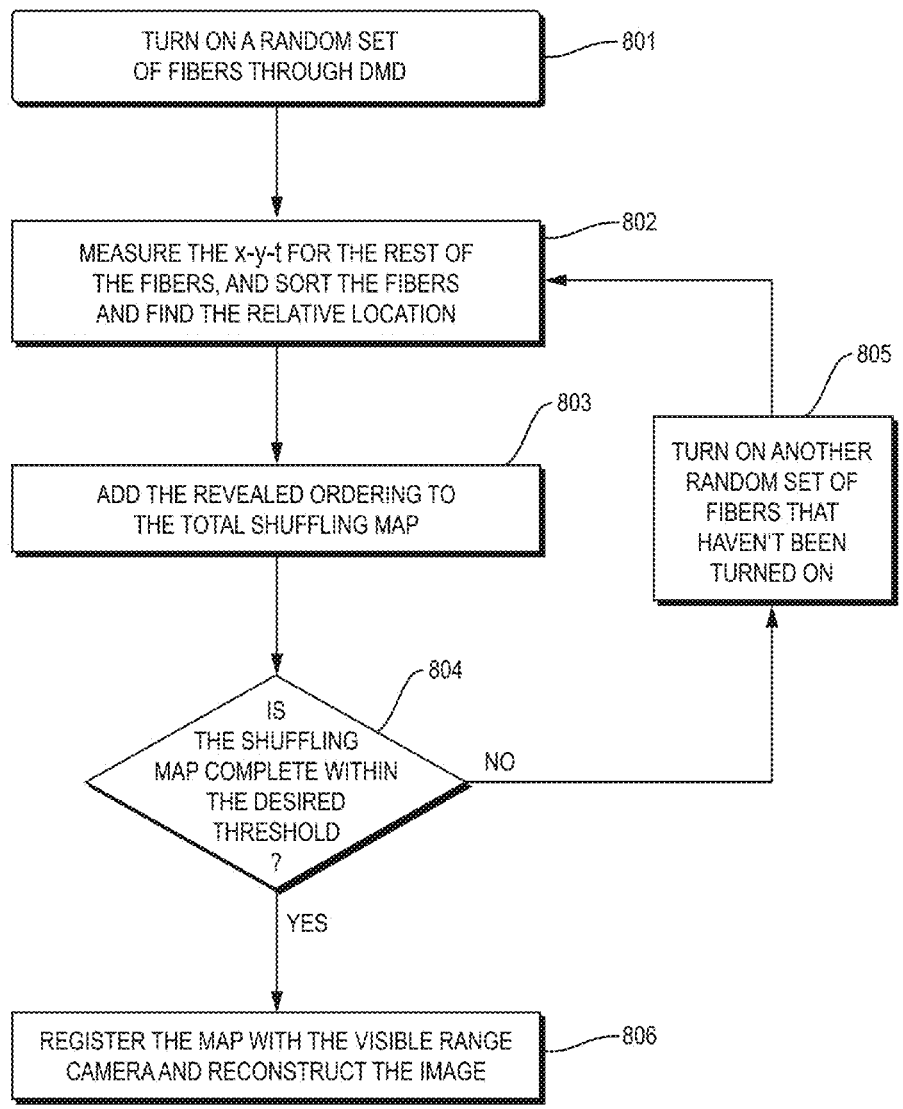
FIG. 8 shows a flowchart for determining the location of shuffled optical fibers.

FIG. 8 shows a flowchart for determining the location of shuffled optical fibers, in an illustrative implementation of this invention. The method includes the following steps: Turn on a random set of fibers via a DMD (Step 801). Measure the x-y-t for the rest of the fibers, and sort the fibers and find the relative location (Step 802). Add the computed ordering to the total shuffling map (Step 803). Determine if the shuffling map is complete within the desired threshold. If yes, go to step 806; if no, go to step 805 (Step 804). Turn on another random set of fibers that have not been turned on (Step 805). Register the map with the visible range camera and reconstruct the image (Step 806).

FIG. 9A shows another flowchart for determining the location of shuffled optical fibers, in an illustrative implementation of this invention. The method includes the following steps: Turn on a dedicated set of fibers via a DMD (Step 811). Measure the x-y-t for the rest of the fibers, and sort the fibers and find the relative location (Step 812). Register the map with the visible range camera and reconstruct the image (Step 813).

FIG. 9B shows a cross-sectional view an open end of an optical fiber bundle. A set of dedicated fibers 901 is located near the perimeter. Fibers 903 are located closer to the center of the bundle than are dedicated fibers 901. Thus, a computer may accurately determine the front-end positions of fibers 903, in the dedicated fibers approach discussed above. The cross-section shown in FIG. 9B is a lateral cross-section of the open end. In the plane of this lateral cross-section, fibers 903 are located in the interior of a 2D convex polyhedron, the vertices of which are the dedicated fibers 901. Thus, a computer may accurately determine the front-end positions of fibers 903, in the dedicated fibers approach discussed above. In FIG. 9B, fibers 902 are located further from the center of fiber bundle than are dedicated fibers 903. Thus, it may be difficult for a computer to accurately determine the front-end positions of fibers 902, in the dedicated fibers approach discussed above. Fibers 902 are located outside of the 2D convex polyhedron mentioned earlier in this paragraph. Thus, it may be difficult for a computer to accurately determine the front-end positions of fibers 902, in the dedicated fibers approach discussed above.

Figure 9C:
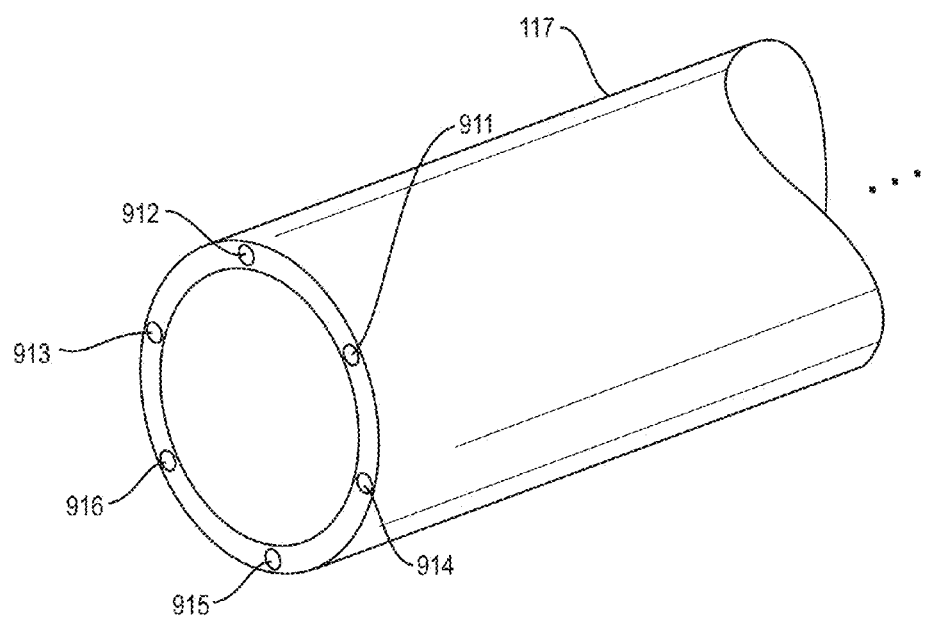
FIG. 9C shows a reference set of light sources with a fixed position relative to the back end of an optical fiber bundle, for image registration.

FIG. 9C shows a reference set of light sources (911, 912, 913, 914, 915, 916), in an illustrative implementation of this invention. The reference set of light sources has a fixed position relative to the back end 319 of an optical fiber bundle.

Figure 9D:
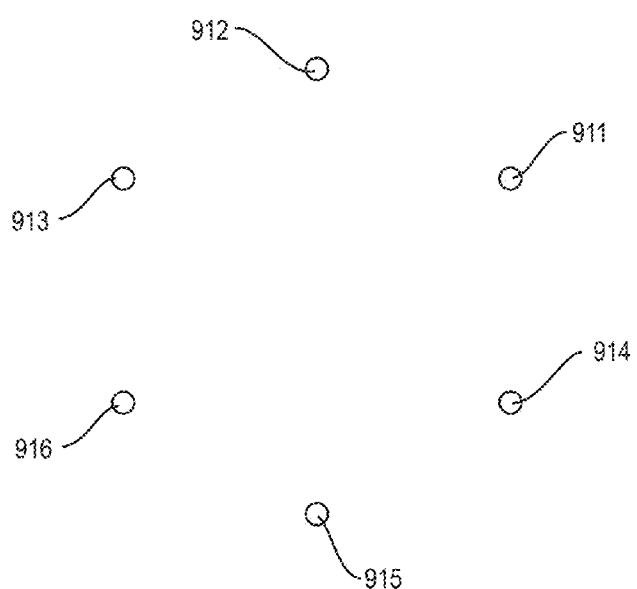
FIG. 9D is a diagram that shows the reference set of light sources, as they appear in an image captured by a camera.

FIG. 9D is another diagram that shows the reference set of light sources (911, 912, 913, 914, 915, 915), in an illustrative implementation of this invention. Specifically, FIG. 9D is a diagram that shows the reference set as it appears in a 2D digital image of the back end 319 of a fiber bundle captured by a visible light camera.

In some cases, a computer treats this reference set of light sources, which have a fixed position relative to the back end of the fiber bundle, as features for correctly registering ToF measurements (e.g., streak output data cube) with the camera output. A computer may perform a feature-based image registration algorithm that treats the reference set of light sources as features, in order to register the ToF data cubes with the ordinary camera image.

For example, in some cases: (a) ToF measurements are taken by a streak camera (as in FIGS. 4 and 5); and (b) the reference set of light sources (911, 912, 913, 914, 915, 916) comprise fibers ("reference fibers") configured such that the fibers always light up earlier than the rest of the fibers in the streak images. For example, a narrow time slot at the top of an x-t slice (e.g., the first 100 rows of the streak image from the top) may be reserved for the reference fibers.

Alternatively, the reference set of light sources may comprise a set of LEDs that are configured to always turn on before a calibration pulse of NIR light (that reflects or scatters to the front end of the fiber bundle, and then transits from the front end to the back end of the fiber bundle) reaches the streak camera (or other ToF sensor).

In the example shown in FIGS. 9C and 9D, there are six light sources in the reference set. However, the number of light sources in the reference set may vary. For example, the number may be an integer greater than or equal to two and less than or equal to one hundred.

FIG. 10 shows an imaging system, in which a SPAD camera gathers time-of-flight data, in an illustrative implementation of this invention.

FIG. 11 shows an imaging system, in which an interferometric sensor gathers time-of-flight data, in an illustrative implementation of this invention.

In the examples shown in FIGS. 10 and 11, either the dedicated fibers or universal approach to calibration may be performed, as described above. For example, the imaging system shown in FIGS. 10 and 11 may perform a one-fiber-at-a-time version or a multiple-fibers-at-a-time version of either approach (dedicated fibers or universal), as discussed above.

In FIGS. 10 and 11, the ToF sensor (e.g., SPAD camera 145 or interferometric sensor 155) takes ToF measurements that indicate time at which a pulse of light reflecting from the scene via a given fiber reaches the ToF sensor. Based on these time signatures, a computer (e.g., 380) calculates the relative position of the front ends of the fibers.

In FIGS. 10 and 11, a solid-state light source 130 emits visible light that travels to the scene via path 128. Light that propagates along path 128 passes through lens 131, then travels to beamsplitter 132, then travels to beamsplitter 116, then enters the back end of the fibers (at the back end 319 of the fiber bundle), then travels through the sheathed portion 117 of the fiber bundle, then travels through the open end 101 of the fiber bundle, then travels to nearby scene 183. The visible light then reflects from the scene 183 to the visible light camera 133 in the reverse direction along path 128, except that beamsplitter 132 steers the light to camera 133 (instead of back to light source 130).

In FIGS. 10 and 11, a laser 110 emits pulses of NIR laser light. For each pulse of laser light, a beamsplitter 112 splits the pulse, such that: (a) a portion of the laser pulse travels in path 800; and (b) another portion of the laser pulse travels in path 118 (FIG. 10) or path 151 (FIG. 11).

In FIGS. 10 and 11, the portion of a light pulse that moves along path 800 travels to a digital micromirror device (DMD) 113, then through lens 114, then to a beamsplitter 115, then to a beam splitter 116, then enters the back end 319 of the fiber bundle, then travels through the sheathed portion 117 of the fiber bundle, then travels to through the open end 101 of the fiber bundle, then travels to scene 183.

In the examples shown in FIGS. 4, 5, 10 and 11, digital camera 133 captures 2D images of visible light.

In FIG. 10, the portion of the laser pulse that moves along path 118 reaches SPAD camera 145, and triggers the SPAD camera to take measurements.

In FIG. 10, the NIR light reflects or scatters to the fiber tips, and then travels to SPAD camera 145 via a path that passes through the open end 101 of the fiber bundle, then through a sheathed portion 117 of the fiber bundle, then through beamsplitter 116, then through beamsplitter 115, and then to the SPAD camera 145.

In the example shown in FIG. 10, a SPAD camera 145 takes ToF measurements. In some cases, the SPAD camera 145 has a time resolution in a range that is greater than or equal to 10 picoseconds and less than or equal to 100 picoseconds. Thus, in some cases, the imaging system shown in FIG. 10 is well-suited for large fiber bundles (e.g., fiber bundles with a millimeter scaler fiber bundles (e.g., fiber bundles with a diameter between 10 mm and 500 mm)

In FIG. 11, laser light travels from beamsplitter 112 to the interferometric sensor 155 along path 151. Light traveling along path 151 leaves beamsplitter 112, then reflects from mirrors 572, 571, 573 and 574, then passes through lens 578, then travels to beamsplitter 153, then enters the interferometric sensor 155. The length of path 151 is adjustable. For example, mirrors may be translated in order to change the length of path 151. In the example shown in FIG. 11, mirrors 571, 573 are mounted on a stage 575. An actuator 576 actuates movement of stage 575, and thus movement of mirrors 571 and 573, in directions that increase or decrease the length of path 151.

In FIG. 11, the NIR light reflects or scatters to the fiber tips, and then travels to interferometric sensor 155 via a path that passes through the open end 101 of the fiber bundle, then through a sheathed portion 117 of the fiber bundle, then through beamsplitter 116, then through beamsplitter 115, then through beamsplitter 153, then to the interferometric sensor 155.

In the example shown in FIG. 11, an interferometric sensor 155 takes ToF measurements using interferometric methods such as widefield OCT (optical coherence tomography) or other interferometric methods based on pulse correlation. In some cases, the imaging system shown in FIG. 11 is well-suited for microscale fiber bundles (e.g., fiber bundles with a diameter between 5 mm and 500 µm).

Figure 12A:
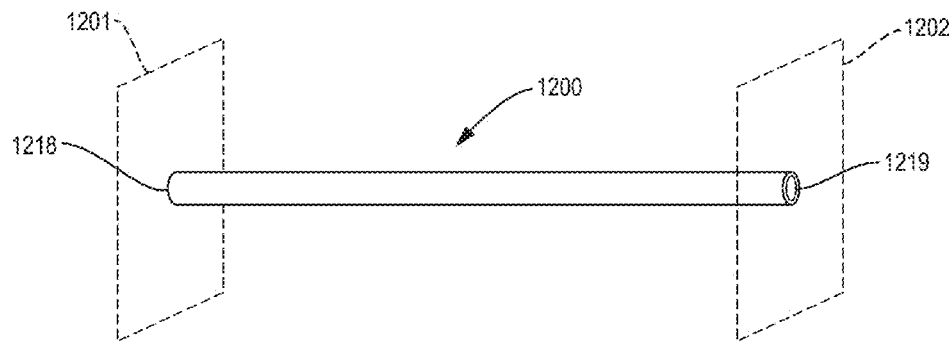
FIG. 12A shows a bundle of optical fibers.

FIG. 12A shows a coherent bundle 1200 of optical fibers. The fiber bundle 1200 has a front end 1218 and a back end 1219. The front end 1218 is closer to scene (not shown) than the back end 1219 is. The bundle is "sliced" by two cross-sectional planes 1201 and 1202 at the front end and back end of the bundle, respectively. Cross-sectional plane 1201 is the geometric plane in which the terminal cross-section (as defined herein) for the front end of the bundle is taken. Cross-sectional plane 1202 is the geometric plane in which the terminal cross-section for the back end of the bundle is taken.

Figure 12B:
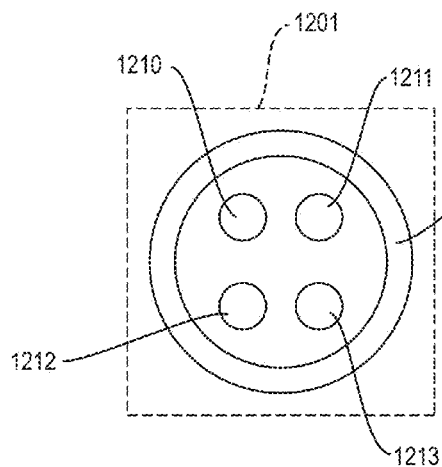
FIG. 12B shows a terminal cross-section of a front end of a fiber bundle.
Figure 12C:
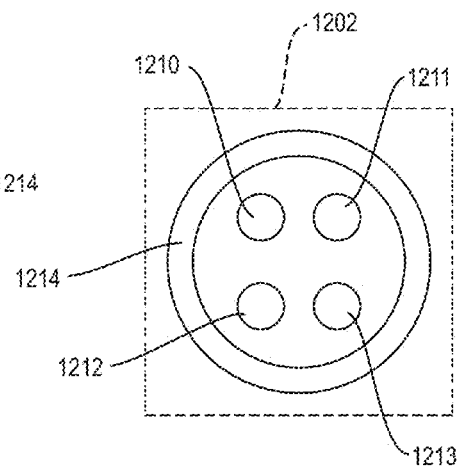
FIG. 12C shows a terminal cross-section of a back end of a fiber bundle.

FIG. 12B shows a cross-sectional view of the terminal cross-section taken at the front end of fiber bundle 1200. FIG. 12C shows a cross-sectional view of the terminal cross-section taken at the back end of fiber bundle 1200.

Fiber bundle 1200 is coherently aligned because the positions of the fibers 1210, 1211, 1212, 1213 relative to each other at the terminal cross-section of the front end of bundle 1200 (as shown in FIG. 12B) are the same as the positions of the fibers relative to each other at the terminal cross-section of the back end of bundle 1200 (as shown in FIG. 12C).

Figure 12D:
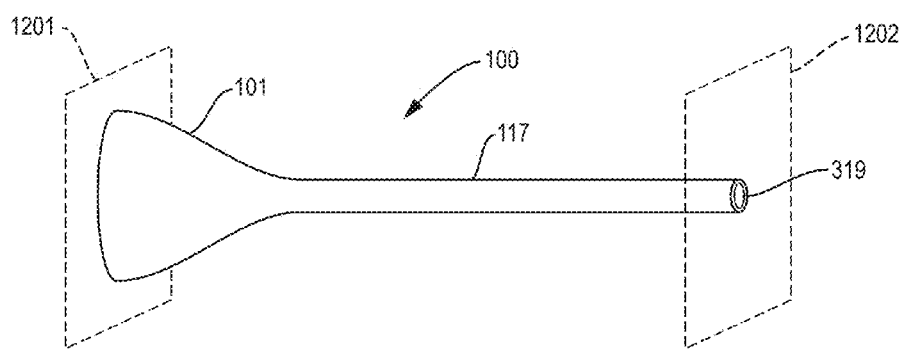
FIG. 12D shows an open-ended bundle of optical fibers.

FIG. 12D shows an incoherent, open-ended bundle of optical fibers 100. In FIG. 12D: (a) cross-sectional plane 1201 is the geometric plane in which the terminal cross-section for the front end of the bundle is taken; and (b) cross-sectional plane 1202 is the geometric plane in which the terminal cross-section for the back end of the bundle is taken.

Figure 12E:
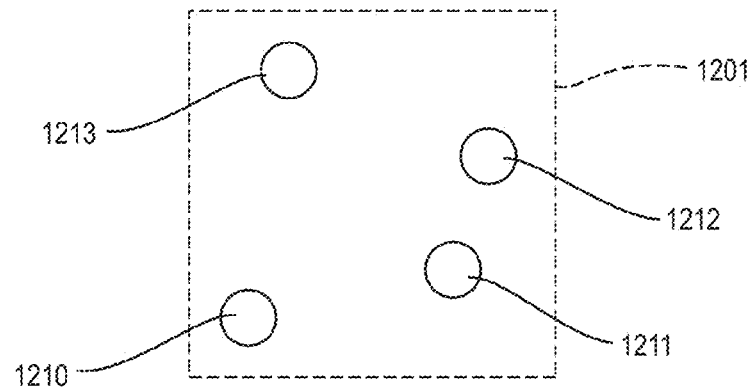
FIG. 12E shows a terminal cross-section of an open end of a fiber bundle.

FIG. 12E shows a cross-sectional view of the terminal cross-section taken at the front end of fiber bundle 100 in FIG. 12D. The cross-sectional view of the terminal cross-section taken at the back end of bundle 100 in FIG. 12D looks the same as FIG. 12C.

Fiber bundle 100 in FIG. 12D is incoherently aligned because the positions of the fibers 1210, 1211, 1212, 1213 relative to each other at the terminal cross-section of the front end of the bundle (shown in FIG. 12D) are quite different than the positions of the fibers relative to each other at the terminal cross-section of the back end of the bundle (which looks the same as that shown in FIG. 12C).

In illustrative implementations of this invention, the fiber bundle may be incoherently aligned and open-ended.

In FIGS. 12B and 12C, outer sheath 1214 annularly surrounds (as defined herein) fibers 1210, 1211, 1212, 1213.

Figure 12F:
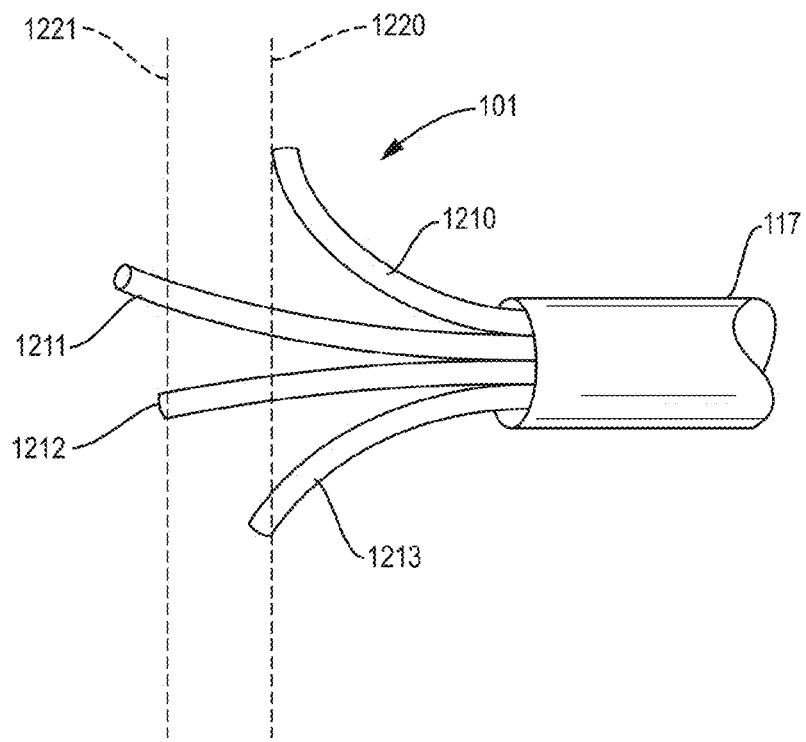
FIG. 12F shows lateral cross-sections of a fiber bundle.

FIG. 12F shows lateral cross-sections of a fiber bundle. The fiber bundle includes a sheathed portion 117 and an open end 101. Fibers 1210, 1211, 1212, 1213 spread out in the open end 101. The fiber bundle is shown in side view. Geometric planes 1220 and 1221 are the geometric planes in which two lateral cross-sections of the open end 101 of the bundle are taken. The lateral cross section taken in plane 1221 is not a complete lateral cross section (as defined herein), because it does not intersect all of the fibers that terminate at that end of the bundle. The lateral cross section taken in plane 1220 is a complete lateral cross section (as defined herein), because it intersects all of the fibers that terminate at that end of the bundle. The lateral cross section taken in plane 1220 is a terminal cross section (as defined herein) because it is the nearest, out of all complete lateral cross-sections of the bundle, to the front of the bundle.

For ease of illustration, FIGS. 12B, 12C, 12E and 12F each show a bundle of only four fibers. In actual practice, the number of fibers would ordinarily be much greater.

Figure 13:
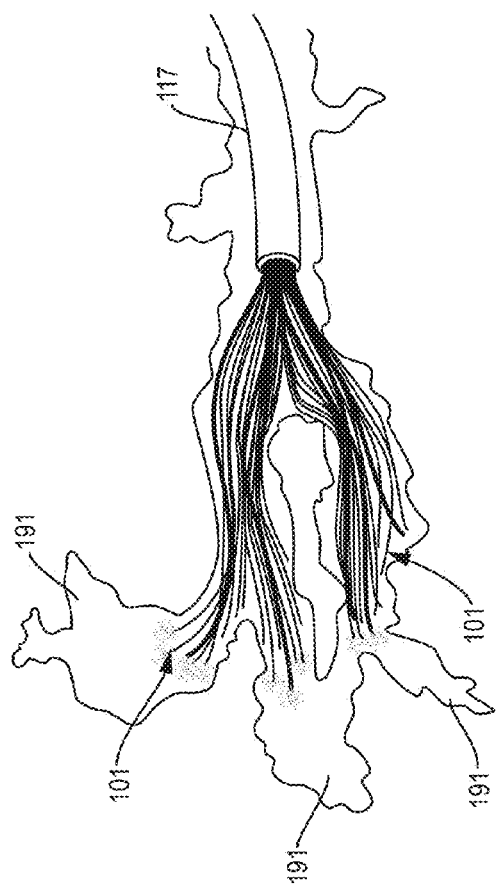
FIG. 13 shows a use scenario for an open-ended bundle of optical fibers.

FIG. 13 shows a use scenario for an open-ended bundle, in an illustrative implementation of this invention. In FIG. 13, the loose ends of the fibers in the open end 101 of the bundle are inserted into an irregularly-shaped cavity 191.

Figure 14:
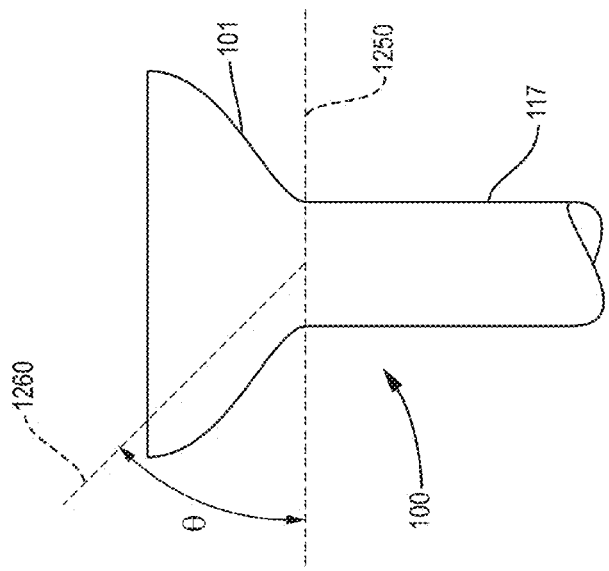
FIG. 14 shows an example of substantially off-axis illumination.

FIG. 14 shows an example of substantially off-axis illumination. In FIG. 14, fiber bundle 100 has a sheathed portion 117 that is annularly surrounded by an outer sheath, and also has an open end 101. Open end 101 is at the front of the fiber bundle. Light ray 1260 strikes the bundle (and the illumination reference plane 1250, as defined herein) at an angle θ. Because ninety degrees minus angle θ is greater than 20 degrees, light ray 1260 strikes the fiber bundle at an angle that is substantially off-axis.

This invention is not limited to a particular type of light source. For example, laser 110 may comprise one or more lasers. Or, laser 110 may be replaced by any other light source (e.g., one or more LEDs, laser diodes, or other solid-state light sources) that emits a pulse train of light. Also, for example, light source 130 may comprise one or more LEDs, laser diodes, or other solid-state light sources or one or more lasers.

This invention is not limited to using visible light for capturing the shuffled digital image and NIR light for calibration. Instead, any combination of wavelengths of light may be employed. For example: (a) light source 130 may emit infrared (IR) light, camera 133 may capture IR images, light source 110 may emit visible light pulses, and the ToF sensor (e.g., streak camera 125, SPAD camera 145, or interferometric sensor 155) may take measurements of the time of arrival of visible light pulses; (b) light sources 110 and 130 may both emit IR light, camera 133 may capture IR images, and the ToF sensor may take measurements of the time of arrival of IR light pulses; (c) light sources 110 and 130 may both emit visible light, camera 133 may capture visible light images, and the ToF sensor may take measurements of the time of arrival of visible light pulses; or (d) one of the light sources (e.g., 110 or 130) may emit two types of light (e.g., visible and IR), the other light source (e.g., 110 or 130) may emit only one type of light (e.g. visible or IR, but not both), and camera(s) and ToF sensor(s) may be configured to capture the type of light emitted.

This invention is not limited to any particular type of ToF sensor. For example, this invention is not limited to using a streak camera 135, SPAD camera 145 or interferometric sensor 155. Instead, any sensor that is configured to measure a time or times at which light reaches the sensor may capture the time at which pulses of light reach the sensor via a given fiber.

Computers

In exemplary implementations of this invention, one or more electronic computers (e.g. 380, 381, 383, 385, 387, 392, 394) are programmed and specially adapted: (1) to control the operation of, or interface with, hardware components of an imaging system that images through a optical fiber bundle, including any light source (e.g., laser or solid state light source), any camera (e.g., a visible light camera), any ToF sensor (e.g., a streak camera, SPAD camera or interferometric sensor), any beamsplitter, or any actuator (e.g., for controlling orientation of a mirror); (2) to compute distance between optical fibers based on time-of-flight measurements; (3) to compute a map that maps from the front-end positions to the back-end positions of fibers in an incoherent fiber bundle; (4) to "de-shuffle" a digital image of the back end of an incoherent fiber bundle, by rearranging the image according to the map, such that the relative positions of the pixels in the de-shuffled image are the same as the relative positions of the regions of the scene to which the pixels correspond; (5) to perform any other calculation, computation, program, algorithm, or computer function described or implied above; (6) to receive signals indicative of human input; (7) to output signals for controlling transducers for outputting information in human perceivable format; and (8) to process data, to perform computations, to execute any algorithm or software, and to control the read or write of data to and from memory devices (items 1-8 of this sentence referred to herein as the "Computer Tasks"). The one or more computers may be in any position or positions within or outside of the imaging system camera. For example, in some cases (a) at least one computer is housed in or together with other components of the system, and (b) at least one computer is remote from other components of the system. The one or more computers communicate with each other or with other components of the system either: (a) wirelessly, (b) by wired connection, (c) by fiber-optic link, or (d) by a combination of wired, wireless or fiber optic links Each computer may store data in, and access data from, a memory device (e.g. 389).

In exemplary implementations, one or more computers are programmed to perform any and all calculations, computations, programs, algorithms, computer functions and computer tasks described or implied above. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium comprises a tangible non-transitory medium. In some cases, the machine-accessible medium comprises (a) a memory unit or (b) an auxiliary memory storage device. For example, in some cases, a control unit in a computer fetches the instructions from a memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, or computer function described or implied above. For example, in some cases, instructions encoded in a tangible, non-transitory, computer-accessible medium comprise instructions for a computer to perform the Computer Tasks.

Network Communication

In illustrative implementations of this invention, an electronic device (e.g., 110, 125, 130, 133, 145, 155, 380, 381, 383, 385, 387, 392, 394) is configured for wireless or wired communication with other electronic devices in a network.

For example, in some cases, electronic devices in the imaging system each include a wireless communication module for wireless communication with other electronic devices in a network. Each wireless communication module (e.g., 382, 384, 386, 388, 390, 393, 395) includes (a) one or more antennas, (b) one or more wireless transceivers, transmitters or receivers, and (c) signal processing circuitry. The wireless communication module receives and transmits data in accordance with one or more wireless standards.

In some cases, one or more of the following hardware components are used for network communication: a computer bus, a computer port, network connection, network interface device, host adapter, wireless module, wireless card, signal processor, modem, router, computer port, cables or wiring.

In some cases, one or more computers (e.g., 380, 381, 383, 385, 387, 392, 394) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), wireless standard (including IEEE 802.11 (wi-fi), IEEE 802.15 (bluetooth/zigbee), IEEE 802.16, IEEE 802.20 and including any mobile phone standard, including GSM (global system for mobile communications), UMTS (universal mobile telecommunication system), CDMA (code division multiple access, including IS-95, IS-2000, and WCDMA), or LTS (long term evolution)), or other IEEE communication standard.

Actuators

In some implementations of this invention, the imaging system includes one or more actuators. For example, in some cases, one or more actuators: (a) translate mirror 122 to create a y-scan of the back end of a fiber bundle; or (b) comprise a pair of electrodes in a DMD that control the position of a micromirror by electrostatic force.

In illustrative implementations, each actuator (including each actuator for actuating any movement) is any kind of actuator, including (a) a linear, rotary, electrical, piezoelectric, electro-active polymer, mechanical or electro-mechanical actuator, or (b) a pair of electrodes for controlling position of a micromirror in a DMD by electrostatic force.

In some cases, the actuator includes and is powered by an electrical motor, including any stepper motor or servomotor. In some cases, the actuator includes a gear assembly, drive train, pivot, joint, rod, arm, or other component for transmitting motion. In some cases, one or more sensors are used to detect position, displacement or other data for feedback to one of more of the actuators.

Definitions

The terms "a" and "an", when modifying a noun, do not imply that only one of the noun exists. For example, to say that a measurement measures time for a respective pulse in a set of pulses and for a respective fiber in the set of fibers, does not imply that the measurement measures time for only a single fiber.

To say that a first object "annularly surrounds" a second object at a given point means that at least one geometric plane exists, such that (a) the geometric plane intersects the given point, and (b) in the geometric plane, a cross-section of the first object completely surrounds a cross-section of the second object. For example, a finger "annularly surrounds" a ring worn on the finger.

To compute "based on" specified data means to perform a computation that takes the specified data as an input.

Here are some non-limiting examples of a "camera": (a) a digital camera; (b) a digital grayscale camera; (c) a digital color camera; (d) a video camera; (e) a light sensor or image sensor, (f) a set or array of light sensors or image sensors; (g) an imaging system; (h) a light field camera or plenoptic camera; (i) a streak camera, SPAD camera, or other time-of-flight camera; and (j) a depth camera. A camera includes any computers or circuits that process data captured by the camera.

To say that a bundle of optical fibers is "coherently aligned" means that, for each set of three fibers in the bundle, the position of the three fibers relative to each other, at a terminal cross-section of the bundle, is substantially the same as the position of the three fibers relative to each other, at the other terminal cross-section of the bundle.

The term "comprise" (and grammatical variations thereof) shall be construed as if followed by "without limitation". If A comprises B, then A includes B and may include other things.

The term "computer" includes any computational device that performs logical and arithmetic operations. For example, in some cases, a "computer" comprises an electronic computational device, such as an integrated circuit, a microcontroller, a microprocessor, a mobile computing device, a laptop computer, a tablet computer, a personal computer, or a mainframe computer. In some cases, a "computer" comprises: (a) a central processing unit, (b) an ALU (arithmetic logic unit), (c) a memory unit, and (d) a control unit that controls actions of other components of the computer so that encoded steps of a program are executed in a sequence. In some cases, a "computer" also includes peripheral units including an auxiliary memory storage device (e.g., a disk drive or flash memory), or includes signal processing circuitry. However, a human is not a "computer", as that term is used herein.

"Core" of an optical fiber means a region of the fiber that is surrounded, in a cross-section of the fiber, by a cladding layer of the fiber, the refractive index of the core being greater than that of the cladding.

"Defined Term" means a term or phrase that is set forth in quotation marks in this Definitions section.

For an event to occur "during" a time period, it is not necessary that the event occur throughout the entire time period. For example, an event that occurs during only a portion of a given time period occurs "during" the given time period.

The term "e.g." means for example.

The term "end", as used herein, shall be construed as follows: A bundle of optical fibers has only two "ends". When light is transmitted through fibers in the bundle, the light enters one "end" of the bundle and exits the other "end" of the bundle. Similarly, an individual optical fiber has only two "ends". When light is transmitted through an individual optical fiber, the light enters one "end" of the fiber and exits the other "end" of the fiber.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

"Fiber" means an optical fiber. "Fiber bundle" or "optical fiber bundle" or "bundle" means a bundle of optical fibers.

"For instance" means for example.

In the context of a camera, "front" is optically closer to the scene being imaged, and "back" is optically farther from the scene, during normal operation of the camera. In the context of a fiber bundle, "front" is optically closer to the scene being imaged, and "back" is optically farther from the scene, during normal operation of the bundle. To travel through a fiber bundle from the back to the front of the bundle means to travel through the bundle toward the scene being imaged. To travel through a fiber bundle from the front to the back of the bundle means to travel through the bundle away from the scene being imaged. To travel through a fiber from the back to the front of the fiber means to travel through the fiber toward the scene being imaged. To travel through a fiber from the front to the back of the fiber means to travel through the fiber away from the scene being imaged. For purposes of this paragraph: (a) to move "toward" a scene means to reduce optical distance to the scene; and (b) to move "away from" a scene means to increase optical distance to the scene.

"Herein" means in this document, including text, specification, claims, abstract, and drawings.

"Illumination reference plane" of a fiber bundle means the geometric plane in which a lateral cross-section of the fiber bundle is taken, which lateral cross-section is the closest, out of all lateral cross-sections of the sheathed portion of the fiber, to the front of the bundle. For purposes of the preceding sentence, the "sheathed portion" of a fiber is the region of the fiber that is annularly surrounded by an outer sheath of the fiber.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

To say that a bundle of optical fibers is "incoherently aligned" means that the bundle is not coherently aligned.

"Intensity" means any measure of or related to intensity, energy or power. For example, the "intensity" of light includes any of the following measures: irradiance, spectral irradiance, radiant energy, radiant flux, spectral power, radiant intensity, spectral intensity, radiance, spectral radiance, radiant exitance, radiant emittance, spectral radiant exitance, spectral radiant emittance, radiosity, radiant exposure or radiant energy density.

A "lateral cross-section" at a given point in an object means a cross-section of the object, which cross-section has an area that is less than or equal to the area of any other cross-section of the object that intersects the given point.

"Light" means electromagnetic radiation of any frequency. For example, "light" includes, among other things, visible light and infrared light. Likewise, any term that directly or indirectly relates to light (e.g., "imaging") shall be construed broadly as applying to electromagnetic radiation of any frequency.

An "open end" of a bundle of optical fibers means a region of the bundle, in which region: (a) fibers in the bundle terminate; (b) the bundle spreads out; and (c) position and orientation of at least some of the fibers in the bundle relative to each other is not fixed in the region.

To say that a bundle of optical fibers is "open-ended" means that the bundle has at least one open end.

The term "or" is inclusive, not exclusive. For example, A or B is true if A is true, or B is true, or both A or B are true. Also, for example, a calculation of A or B means a calculation of A, or a calculation of B, or a calculation of A and B.

"Outer sheath" of a bundle of optical fibers means an integral structure that annularly surrounds the fibers as a group, at all points in a region of bundle.

A parenthesis is simply to make text easier to read, by indicating a grouping of words. A parenthesis does not mean that the parenthetical material is optional or may be ignored.

As used herein, the term "set" means a group that consists of two or more elements. For example: (a) a set of pulses consists of two or more pulses; and (b) a set of optical fibers consists of two or more optical fibers.

"Some" means one or more.

"SPAD camera" means a camera that detects an avalanche of electrons caused by one or more photons of incident light striking the sensor in the camera. The term "SPAD camera" does not imply that the avalanche must be triggered by only a single photon. The avalanche threshold of the camera may be set such that, for a given range of wavelengths of light, the threshold is sufficiently high that an avalanche is triggered only by multiple photons in that range of wavelengths striking the sensor.

To say that a bundle of optical fibers "spreads out" in a region means that a first density is at least twenty percent greater than a second density, where: (a) the first density is the number of fibers per unit area in a first lateral cross section of the bundle at a first point in the region; and (b) the second density is the number of fibers per unit area in a second lateral cross section of the bundle at a second point in the region.

"Streak camera" means a camera in which: (a) incident light causes a photocathode to emit electrons; (b) a varying field causes the electrons to undergo deflection; (c) the amount of the deflection varies during capture of a single image; and (d) an axis of an image captured by the camera corresponds to a time dimension, such that displacement along the axis corresponds to changes in time at which light was recorded in the image.

"Streak image" means an image captured by a streak camera.

As used herein, a "subset" of a set consists of less than all of the elements of the set.

To say that illumination strikes a fiber bundle at an angle that is "substantially off-axis" means that a light ray in the illumination strikes the bundle at an acute angle that is greater than 20 degrees. For purposes of the preceding sentence: (a) the vertex of the acute angle is the point at which the light ray strikes the bundle; (b) one side of the angle is the light ray; and (c) the other side of the angle is a straight line that intersects the vertex and is perpendicular to the illumination reference plane of the bundle.

To say that the position of fibers A, B and C relative to each other is "substantially the same" in a first cross-section and a second cross-section means that: (a) for the first cross-section, there exists a first 2D Cartesian coordinate system, such that the first coordinate system has its origin at fiber A and an x-axis that intersects fiber B; (b) for the second cross-section, there exists a second 2D Cartesian coordinate system, such that (i) the first and second coordinate systems have the same unit of distance and (ii) the second coordinate system has its origin at fiber A and an x-axis that intersects fiber B; (c) the x-coordinate of fiber B in the first coordinate system differs from the x-coordinate of fiber B in the second coordinate system by less than 5 percent; (d) the y-coordinate of fiber B in the first coordinate system differs from the y-coordinate of B in the second coordinate system by less than 5 percent; (e) the x-coordinate of fiber C in the first coordinate system differs from the x-coordinate of fiber C in the second coordinate system by less than 5 percent; and (f) the y-coordinate of fiber C in the first coordinate system differs from the y-coordinate of C in the second coordinate system by less than 5 percent. For purposes of the preceding sentence, fibers A, B and C are, for each respective cross-section, treated as being located at their respective 2D centroids in that cross-section.

The term "such as" means for example.

"Terminal cross-section" of a bundle of optical fibers means a complete lateral cross-section which is the nearest, out of all complete lateral cross-sections of the bundle, to the front or back of the bundle. For purposes of the preceding sentence, a "complete" lateral cross-section means a lateral cross-section that intersects all of the fibers that terminate at a given end of a bundle. Each bundle of optical fibers has only two terminal cross-sections, one at each end of the bundle. Each bundle of optical fibers may have many complete lateral cross-sections.

To say that light travels "through" an optical fiber means that the light travels inside the core of the fiber, from one end to the other end of the fiber. To say that light travels "through" a fiber bundle means that the light travels through one or more fibers in the bundle.

To take a measurement of a time at which an event occurs means to take a measurement that indicates how much time elapsed between a reference time and the occurrence of the event. For example, to capture a streak image that records an event is to take a measurement of the time at which an event occurs, because displacement along an axis of the streak image indicates amount of time elapsed.

"ToF" means time-of-flight.

To say that a machine-readable medium is "transitory" means that the medium is a transitory signal, such as an electromagnetic wave.

Except to the extent that the context clearly requires otherwise, if steps in a method are described herein, then the method includes variations in which: (1) steps in the method occur in any order or sequence, including any order or sequence different than that described; (2) any step or steps in the method occurs more than once; (3) different steps, out of the steps in the method, occur a different number of times during the method, (4) any combination of steps in the method is done in parallel or serially; (5) any step or steps in the method is performed iteratively; (6) a given step in the method is applied to the same thing each time that the given step occurs or is applied to different things each time that the given step occurs; or (7) the method includes other steps, in addition to the steps described.

This Definitions section shall, in all cases, control over and override any other definition of the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. To the extent that any term or phrase is defined or clarified herein, such definition or clarification applies to any grammatical variation of such term or phrase, taking into account the difference in grammatical form. For example, the grammatical variations include noun, verb, participle, adjective, and possessive forms, and different declensions, and different tenses. In each case described in this paragraph, the Applicant or Applicants are acting as his, her, its or their own lexicographer.

Variations

This invention may be implemented in many different ways. Here are some non-limiting examples:

In some implementations, this invention is a system comprising: (a) a bundle of optical fibers, which bundle includes a set of fibers; (b) a first light source for emitting light that illuminates a scene, such that the light reflects from the scene and is transmitted through the bundle from the front to the back of the bundle; (c) a camera for capturing a digital image of the back end of the bundle; (d) a second light source for emitting a set of pulses of light, such that (i) light from the pulses enters the front ends of the fibers in the set of fibers and is transmitted through the bundle from the front to the back of the bundle, and (ii) for each respective fiber in the set of fibers, the time at which a pulse enters the respective fiber depends on the position of the front end of the respective fiber; (e) a sensor for taking measurements, wherein each measurement measures, for a respective pulse in the set of pulses and for a respective fiber in the set of fibers, a time or times at which light from the respective pulse reached the sensor after traveling through the respective fiber from the front to the back of the respective fiber; and (f) a computer that is programmed (i) to calculate, based on the measurements, a map that maps, for each respective fiber in the set of fibers, position of the front end of the respective fiber to position of the back end of the respective fiber, and (ii) to modify, based on the map, the digital image. In some cases, the sensor comprises a streak camera. In some cases, the sensor comprises a SPAD camera. In some cases, the sensor comprises an interferometric sensor. In some cases, at least one pulse in the set of pulses travels from the back to the front of the bundle through only one fiber in the set of fibers, before traveling from the front to the back of the bundle through multiple fibers in the set of fibers. In some cases, at least one pulse in the set of pulses travels from the back to the front of the bundle through multiple fibers in the set of fibers, before traveling from the front to the back of the bundle through multiple fibers in the set of fibers. In some cases, no pulse in the set of pulses travels through the bundle from the back to the front of the bundle, before traveling from the front to the back of the bundle through multiple fibers in the set of fibers. In some cases, at least one pulse, out of the set of pulses, strikes the bundle at an angle that is substantially off-axis. In some cases, the bundle is incoherently aligned. In some cases, the bundle is open-ended. Each of the cases described above in this paragraph is an example of the system described in the first sentence of this paragraph, and is also an example of an embodiment of this invention that may be combined with other embodiments of this invention.

In some implementations, this invention is a method comprising: (a) a first light source emitting light that illuminates a scene, such that the light reflects from the scene and is transmitted through a bundle of optical fibers from the front to the back of the bundle, which bundle includes a set of optical fibers; (b) a camera capturing a digital image of the back end of the bundle; (c) a second light source emitting a set of pulses of light, such that (i) light from the pulses enters the front ends of the fibers in the set of fibers and is transmitted through the bundle from the front to the back of the bundle, and (ii) for each respective fiber in the set of fibers, the time at which a pulse enters the respective fiber depends on the position of the front end of the respective fiber; (d) a sensor taking measurements, wherein each measurement measures, for a respective pulse in the set of pulses and for a respective fiber in the set of fibers, a time or times at which light from the respective pulse reached the sensor after traveling through the respective fiber from the front to the back of the respective fiber; and (e) a computer (i) calculating, based on the measurements, a map that maps, for each respective fiber in the set of fibers, position of the front end of the respective fiber to position of the back end of the respective fiber, and (ii) modifying, based on the map, the digital image. In some cases, the sensor comprises a streak camera. In some cases, the sensor comprises a SPAR camera. In some cases, the sensor comprises an interferometric sensor. In some cases, at least one pulse in the set of pulses travels from the back to the front of the bundle through only one fiber in the set of fibers, before traveling from the front to the back of the bundle through multiple fibers in the set of fibers. In some cases, at least one pulse in the set of pulses travels from the back to the front of the bundle through multiple fibers in the set of fibers, before traveling from the front to the back of the bundle through multiple fibers in the set of fibers. In some cases, no pulse in the set of pulses travels through the bundle from the back to the front of the bundle, before traveling from the front to the back of the bundle through multiple fibers in the set of fibers. In some cases, at least one pulse, out of the set of pulses, strikes the bundle at an angle that is substantially off-axis. In some cases, the bundle is incoherently aligned. In some cases, the bundle is open-ended. Each of the cases described above in this paragraph is an example of the method described in the first sentence of this paragraph, and is also an example of an embodiment of this invention that may be combined with other embodiments of this invention.

The above description (including without limitation any attached drawings and figures) describes illustrative implementations of the invention. However, the invention may be implemented in other ways. The methods and apparatus which are described above are merely illustrative applications of the principles of the invention. Other arrangements, methods, modifications, and substitutions by one of ordinary skill in the art are therefore also within the scope of the present invention. Numerous modifications may be made by those skilled in the art without departing from the scope of the invention. Also, this invention includes without limitation each combination and permutation of one or more of the abovementioned implementations, embodiments and features.

What is claimed is:

1. An apparatus comprising:
   (a) a set of optical fibers;
   (b) a first light source;
   (c) a second light source;
   (d) a first camera;
   (e) a second camera; and
   (f) a computer;
   wherein
   (i) the first light source is configured to emit visible light that illuminates a scene, reflects from the scene, and is transmitted through the fibers from front ends to back ends of the fibers,
   (ii) the first camera is configured to capture a digital image of the back ends of the fibers while the visible light is being transmitted through the fibers,
   (iii) the second light source is configured to emit a set of pulses of infrared light that illuminate the scene, reflect from the scene, and are transmitted through the fibers from the front ends to the back ends of the fibers,
   (iv) the second camera is configured to take measurements, wherein each measurement measures, for a respective pulse in the set of pulses and for a respective fiber in the set of fibers, a time or times at which light from the respective pulse reaches the sensor after traveling through the respective fiber from the front to the back of the respective fiber; and
   (v) the computer is programmed
   (A) to calculate, based on the measurements, a map that maps, for each respective fiber in the set of fibers, position of a front end of the respective fiber to position of a back end of the respective fiber, and
   (B) to modify, based on the map, the digital image.

2. The apparatus of claim 1, wherein the time at which a given pulse in the set of pulses enters a given fiber in the set of fibers depends on the position of the front end of the given fiber.

3. The apparatus of claim 1, wherein the sensor comprises a streak camera.

4. The apparatus of claim 1, wherein the sensor comprises a SPAD camera.

5. The apparatus of claim 1, wherein the sensor comprises an interferometric sensor.

6. The apparatus of claim 1, wherein at least one pulse in the set of pulses travels from the back to the front of the set of fibers through only one fiber in the set of fibers, before traveling from the front to the back of the set of fibers through multiple fibers in the set of fibers.

7. The apparatus of claim 1, wherein at least one pulse in the set of pulses travels from the back to the front of the set of fibers simultaneously through multiple fibers in the set of fibers, before traveling from the back to the front of the set of fibers through multiple fibers in the set of fibers.

8. The apparatus of claim 1, wherein the apparatus further comprises optical elements that are configured to steer the pulses of light toward the scene in such a manner that:
 (a) some of the pulses of light strike the scene at a first orientation relative to the scene and some of the pulses of light strike the scene at a second orientation relative to the scene, the first orientation being different than the second orientation; and
 (b) none of the pulses of light are transmitted from the back to the front of the fibers before striking the scene.

9. The apparatus of claim 1, wherein the fibers are incoherently aligned.

10. The apparatus of claim 1, wherein the fibers are configured in such a manner that:
 (a) in a front portion of the fibers, the fibers spread out and have an orientation relative to each other that is variable; and
 (b) in a rear portion of the fibers, the fibers are, as a group, annularly surrounded by an outer sheath.

11. A method comprising:
 (a) emitting visible light that illuminates a scene, in such a manner that the visible light reflects from the scene and is transmitted through a set of optical fibers from front ends to back ends of the fibers;
 (b) capturing a digital image of the back ends of the fibers while the visible light is being transmitted through the fibers;
 (c) emitting a set of pulses of light, in such a manner that light from the pulses enters the front ends of the fibers and is transmitted through the fibers from the front ends to the back ends of the fibers;
 (d) taking measurements, wherein each measurement measures, for a respective pulse in the set of pulses and for a respective fiber in the set of fibers, a time or times at which light from the respective pulse reaches a camera after traveling through the respective fiber from the front to the back of the respective fiber;
 (e) calculating, based on the measurements, a map that maps, for each respective fiber in the set of fibers, position of a front end of the respective fiber to position of a back end of the respective fiber, and
 (f) modifying, based on the map, the digital image.

12. The method of claim 11, wherein the time at which a given pulse in the set of pulses enters a given fiber in the set of fibers depends on the position of the front end of the given fiber.

13. The method of claim 11, wherein the sensor comprises a streak camera.

14. The method of claim 11, wherein the sensor comprises a SPAR camera.

15. The method of claim 11, wherein the sensor comprises an interferometric sensor.

16. The method of claim 11, wherein at least one pulse in the set of pulses travels from the back to the front of the set of fibers through only one fiber in the set of fibers, before traveling from the front to the back of the set of fibers through multiple fibers in the set of fibers.

17. The method of claim 11, wherein at least one pulse in the set of pulses travels from the back to the front of the set of fibers simultaneously through multiple fibers in the set of fibers, before traveling from the front to the back of the set of fibers through multiple fibers in the set of fibers.

18. The method of claim 11, further comprising steering the pulses of light toward the scene in such a manner that:
 (a) some of the pulses of light strike the scene at a first orientation relative to the scene and some of the pulses of light strike the scene at a second orientation relative to the scene, the first orientation being different than the second orientation; and
 (b) none of the pulses of light are transmitted from the back to the front of the fibers before striking the scene.

19. The method of claim 11, wherein the fibers are incoherently aligned.

20. The method of claim 11, wherein the fibers are configured in such a manner that:
 (a) in a front portion of the fibers, the fibers spread out and have an orientation relative to each other that is variable; and
 (b) in a rear portion of the fibers, the fibers are, as a group, annularly surrounded by an outer sheath.

* * * * *